United States Patent
Kanda et al.

(10) Patent No.: US 7,904,513 B2
(45) Date of Patent: Mar. 8, 2011

(54) CLIENT APPARATUS, SERVER APPARATUS, SERVER-BASED COMPUTING SYSTEM, AND PROGRAM

(75) Inventors: Hirokazu Kanda, Ome (JP); Junichi Maeda, Higashiyamato (JP)

(73) Assignee: Casio Computer Co., Ltd., Tokyo (JP)

(*) Notice: Subject to any disclaimer, the term of this patent is extended or adjusted under 35 U.S.C. 154(b) by 83 days.

(21) Appl. No.: 11/844,729

(22) Filed: Aug. 24, 2007

(65) Prior Publication Data

US 2008/0059569 A1 Mar. 6, 2008

(30) Foreign Application Priority Data

Aug. 31, 2006 (JP) .................................. 2006-234804

(51) Int. Cl.
*G06F 15/16* (2006.01)
*G06F 15/173* (2006.01)

(52) U.S. Cl. .......................... 709/204; 709/224; 709/246
(58) Field of Classification Search .................. 709/204, 709/206, 207, 224, 246
See application file for complete search history.

(56) References Cited

U.S. PATENT DOCUMENTS

| | | | |
|---|---|---|---|
| 4,833,535 A | 5/1989 | Ozeki et al. | |
| 5,634,052 A | 5/1997 | Morris | |
| 5,818,616 A * | 10/1998 | Kawai | 398/72 |
| 5,848,415 A * | 12/1998 | Guck | 707/10 |
| 6,006,231 A | 12/1999 | Popa | |
| 6,016,478 A * | 1/2000 | Zhang et al. | 705/9 |
| 6,192,393 B1 | 2/2001 | Tarantino et al. | |
| 6,204,846 B1 | 3/2001 | Little et al. | |
| 6,343,313 B1 * | 1/2002 | Salesky et al. | 709/204 |
| 6,363,352 B1 * | 3/2002 | Dailey et al. | 705/9 |
| 6,434,599 B1 * | 8/2002 | Porter | 709/204 |
| 6,636,888 B1 * | 10/2003 | Bookspan et al. | 709/203 |
| 6,647,360 B2 | 11/2003 | Graham et al. | |
| 6,658,167 B1 | 12/2003 | Lee et al. | |
| 6,661,353 B1 | 12/2003 | Gopen | |
| 6,664,969 B1 | 12/2003 | Emerson et al. | |
| 6,704,024 B2 | 3/2004 | Robotham et al. | |
| 6,710,790 B1 | 3/2004 | Fagioli | |
| 6,732,103 B1 * | 5/2004 | Strick et al. | 707/10 |
| 6,973,457 B1 | 12/2005 | Bastawala et al. | |
| 7,200,615 B2 | 4/2007 | Eschbach et al. | |

(Continued)

FOREIGN PATENT DOCUMENTS

EP 0689342 12/1995

(Continued)

OTHER PUBLICATIONS

Written Opinion of PCT/JP2007/054138 dated Jul. 25, 2007.

(Continued)

*Primary Examiner* — Hussein A Elchanti
(74) *Attorney, Agent, or Firm* — Turocy & Watson, LLP

(57) ABSTRACT

A client apparatus which transmits a service request to a server apparatus via a network, the server apparatus generating screen information to be displayed on a virtual screen, the screen information including display data and coordinate data corresponding to the service request, the client apparatus comprises an extraction unit configured to extract screen information corresponding to a designated area, which is a partial area of the virtual screen, from the screen information generated by the server apparatus, and a display unit configured to constantly display the screen information extracted by the extraction unit on a constant display area, which is a partial area of a client screen.

10 Claims, 24 Drawing Sheets

U.S. PATENT DOCUMENTS

| | | |
|---|---|---|
| 2003/0063043 A1 | 4/2003 | Girard |
| 2004/0169668 A1 | 9/2004 | Yamada et al. |
| 2004/0217980 A1 | 11/2004 | Radburn et al. |
| 2005/0024364 A1 | 2/2005 | Shouen |
| 2005/0172221 A1 | 8/2005 | Kobashi et al. |
| 2005/0210399 A1 | 9/2005 | Filner et al. |
| 2005/0259881 A1 | 11/2005 | Goss |
| 2005/0281482 A1 | 12/2005 | Nishiyama |
| 2006/0050973 A1 | 3/2006 | Ishikawa |
| 2006/0110171 A1 | 5/2006 | Miyazawa et al. |
| 2006/0123121 A1 | 6/2006 | Maegawa et al. |
| 2006/0209094 A1 | 9/2006 | Usuda |
| 2006/0221097 A1 | 10/2006 | Kagechi et al. |
| 2007/0005690 A1 | 1/2007 | Corley et al. |
| 2007/0130251 A1 | 6/2007 | Ohtsuka |
| 2007/0150829 A1 | 6/2007 | Eschbach et al. |
| 2007/0192509 A1 | 8/2007 | Ohtsuka et al. |
| 2007/0211066 A1 | 9/2007 | Kanda |
| 2007/0234229 A1 | 10/2007 | Ohtsuka et al. |
| 2007/0245021 A1 | 10/2007 | Ohtsuka et al. |
| 2007/0297596 A1 | 12/2007 | Matsubara |
| 2008/0077660 A1 | 3/2008 | Tomida |
| 2009/0016641 A1 | 1/2009 | Paladini et al. |
| 2009/0094263 A1 | 4/2009 | Shiran et al. |
| 2009/0241057 A1 | 9/2009 | Toda |

FOREIGN PATENT DOCUMENTS

| | | |
|---|---|---|
| EP | 1450277 | 8/2004 |
| EP | 1503344 | 2/2005 |
| JP | 08-116545 | 5/1996 |
| JP | 09-044338 | 2/1997 |
| JP | 2003-158534 | 5/2003 |
| JP | 2003-198857 | 7/2003 |
| JP | 2004-503862 | 2/2004 |
| JP | 2004-171063 | 6/2004 |
| JP | 2004-348380 | 12/2004 |
| JP | 2005-128279 | 5/2005 |
| JP | 2005-228227 | 8/2005 |
| JP | 2007-241710 | 9/2007 |
| JP | 2008-134853 | 6/2008 |
| WO | 0197014 A2 | 12/2001 |
| WO | 0197014 A3 | 12/2001 |
| WO | 0243365 | 5/2002 |
| WO | 02/079913 | 10/2002 |

OTHER PUBLICATIONS

International Search Report for PCT/JP2007/054138 dated Jul. 25, 2007.
International Search Report for PCT/JP2007/052902 dated Jan. 25, 2008.
Office Action for U.S. Appl. No. 11/674,514 mailed on Jul. 29, 2009.
Office Action for U.S. Appl. No. 11/674,514 mailed on Mar. 10, 2010.
Written Opinion of PCT/JP2007/057511 dated Jul. 23, 2007.
International Search Report for PCT/JP2007/057511 dated Jul. 23, 2007.
Office Action for U.S. Appl. No. 11/693,346 mailed on Sep. 25, 2009.
U.S. Appl. No. 12/722,876, filed Mar. 12, 2010.
Japanese Office Action for 2006-036652 mailed on Jan. 26, 2010.
Japanese Office Action for 2008-070365 mailed on Mar. 30, 2010.
Japanese Office Action for 2006-036652 mailed on Apr. 13, 2010.
Office Action for U.S. Appl. No. 11/693,346 mailed on Jun. 3, 2010.
Office Action for U.S. Appl. No. 11/683,763 mailed on Apr. 30, 2010.
OA dated Sep. 29, 2010 for U.S. Appl. No. 11/683,763, 21 pages.

* cited by examiner

| ITEM | X COORDINATE | Y COORDINATE |
|---|---|---|
| DESIGNATED AREA (COORDINATES IN VIRTUAL SCREEN) | 0~799 | 570~599 |
| CONSTANT DISPLAY AREA (COORDINATES IN CLIENT SCREEN) | 0~399 | 270~299 |
| DISPLAY MAGNIFICATION | 0.5 | 1 |

| X COORDINATE | Y COORDINATE | OPERATION |
|---|---|---|
| 0~64<br>600~799 | 570~599 | SCROLL TO DISPLAY POSITION ON VIRTUAL SCREEN (IN CLICKING) |

CLICK COORDINATES
(350, 435)

FIG.24

| ITEM | X COORDINATE | Y COORDINATE |
|---|---|---|
| DESIGNATED AREA (COORDINATES IN VIRTUAL SCREEN) | 0~799 | 570~599 |
| CONSTANT DISPLAY AREA (COORDINATES IN CLIENT SCREEN) | 0~399 | 270~299 |
| DISPLAY MAGNIFICATION | 0.5 | 1 |
| DISPLAY CONDITION: IN CASE WHERE POINTER INDICATES CONSTANT DISPLAY AREA | | |

| X COORDINATE | Y COORDINATE | OPERATION |
|---|---|---|
| 0~64<br>600~799 | 570~599 | SCROLL TO DISPLAY POSITION ON VIRTUAL SCREEN (IN CLICKING) |

CLIENT APPARATUS, SERVER APPARATUS, SERVER-BASED COMPUTING SYSTEM, AND PROGRAM

CROSS-REFERENCE TO RELATED APPLICATIONS

This application is based upon and claims the benefit of priority from prior Japanese Patent Application No. 2006-234804, filed Aug. 31, 2006, the entire contents of which are incorporated herein by reference.

BACKGROUND OF THE INVENTION

1. Field of the Invention

The present invention relates to a server-based computing system in which a client apparatus, which makes a service request to a server apparatus, and the server apparatus, which operates an application program based on the service request, are connectable via a network.

2. Description of the Related Art

In recent years, adoption of a server-based computing system by businesses is accelerated.

A server-based computing system (thin client system) is a system in which a client apparatus (also called as a thin client apparatus) and a server apparatus are interconnected via a network. In the server-based computing system, when the client apparatus makes a service request to the server apparatus, the server apparatus manages data and operates an application program based on the service request from the client apparatus (refer to, e.g., Jpn. Pat. Appln. KOKAI Publication No. 2005-228227).

The client apparatus sends information of operation by a user through a key, a mouse, etc., to the server apparatus via the network. The server apparatus creates display data to be displayed by the client apparatus and sends the created display data to the client apparatus. The client apparatus receives the display data created by the server apparatus and displays the created display data. The client apparatus needs to include merely network equipment, a display device and an input device such as a mouse or a keyboard. The client apparatus does not store data therein and therefore does not need storage such as a hard disk. The client apparatus does not execute application program; accordingly processing load can be reduced.

In the above described server-based computing system, the server apparatus creates display data assuming that the display data will be displayed on a display screen of the server apparatus, which is, in general, larger than the display screen of the client apparatus. Some client apparatus have a scroll function and a function of displaying reduced screen in order to display the entire display data on the display screen of the client apparatus which is smaller than the assumed display screen.

For example, Jpn. Pat. Appln. KOKAI Publication No. 2004-348380 discloses a method for acquiring information on a scaling factor and a display region of a window, which is in a controllable state on a display screen of a server apparatus. The acquirement is performed in order that the window can be displayed on a display screen of a client apparatus together with a scroll bar. The information is acquired based on a size and coordinate data of the display screen of the client apparatus, and based on a size and a coordinate data of the window, by means of a gateway which connects the client apparatus and the server apparatus. The server apparatus creates screen information from display data which corresponds to the display region by expanding or reducing the display data based on the scaling factor. The server apparatus transmits the created screen information to the client apparatus via the gateway. Thereby, the window which is displayed on the display screen of the server apparatus can be displayed together with the scroll bar on the display screen of the client apparatus such as a mobile phone. A workload of a user for referring the window may be reduced by a scroll operation, and the display screen of the client apparatus can be utilized efficiently. According to the above configuration, even when the size of a window displayed on the display screen of the server apparatus does not accord with the size of the display screen of the client apparatus, the window can be displayed with the scroll bar on the display screen of the client apparatus. Therefore, it is not necessary for the user of the client apparatus to perform scroll operation for finding out the window.

In a window system or the like, a task bar is displayed at a lower section or the like of the display screen. On the task bar, shown are various function buttons, such as a start button, a button indicating a file or a folder in use, a variety of indicators and a language bar. When a function button on the task bar is operated, a corresponding application is started, or a desired file or folder is brought to front of the display screen. Whether the display screen is scrolled or not, it is convenient for the user that the task bar is always displayed on the display screen.

However, depending on a display status of the display screen of the client apparatus, there is a case in which the task bar may not be displayed. When the task bar is not displayed, the user should perform scroll operation in order to display the task bar. Therefore, an inherent effectiveness of the task bar will be spoiled.

BRIEF SUMMARY OF THE INVENTION

According to an embodiment of the present invention, a client apparatus which transmits a service request to a server apparatus via a network, the server apparatus generating screen information to be displayed on a virtual screen, the screen information including display data and coordinate data corresponding to the service request, the client apparatus comprises:

an extraction unit configured to extract screen information corresponding to a designated area, which is a partial area of the virtual screen, from the screen information generated by the server apparatus; and a display unit configured to constantly display the screen information extracted by the extraction unit on a constant display area, which is a partial area of a client screen.

According to another embodiment of the present invention, a client apparatus which transmits a service request to a server apparatus via a network, the server apparatus generating screen information to be displayed on a virtual screen, the screen information including display data and coordinate data corresponding to the service request, the client apparatus comprises:

a setting information request unit configured to make a request to the server apparatus for setting information on a designated area, which is a partial area of the virtual screen;

a setting information reception unit configured to receive the setting information which the server apparatus transmits in response to the request made by the setting information request unit;

an extraction unit configured to extract screen information corresponding to the designated area from the screen information generated by the server apparatus; and a display unit configured to constantly display the screen information extracted by the extraction unit on a constant display area, which is a partial area of a client screen, based on the setting information received by the setting information reception unit.

According to another embodiment of the present invention, a server based computing system includes a client apparatus and a server apparatus, the client apparatus transmitting a service request to the server apparatus via a network, the server apparatus generating screen information to be displayed on a virtual screen, the screen information including display data and coordinate data corresponding to the service request, the client apparatus comprising:

a setting information request unit configured to make a request to the server apparatus for setting information on a designated area, which is a partial area of the virtual screen;

a setting information reception unit configured to receive the setting information which the server apparatus transmits in response to the request made by the setting information request unit;

an extraction unit configured to extract screen information corresponding to the designated area from the screen information generated by the server apparatus; and a display unit configured to constantly display the screen information extracted by the extraction unit on a constant display area, which is a partial area of a client screen, based on the setting information received by the setting information reception unit, the server apparatus comprising:

a setting information transmission unit configured to transmit the setting information on the designated area to the client apparatus, wherein the display unit constantly displays the screen information corresponding to the designated area on the constant display area based on the setting information, which is transmitted from the setting information transmission unit and received by the setting information reception unit.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 24 is a view showing the setting table of the constant display area according to the second embodiment;

DETAILED DESCRIPTION OF THE INVENTION

Outline of an embodiment of the present invention will be firstly described below.

The thin client system according to an embodiment of the present invention includes a server apparatus which executes an application program; a client apparatus which transmits operation information caused by a user to the server apparatus, acquires screen information from the server apparatus, and displays the screen information on a display screen thereof; and a network (communication network) for data communication between the server apparatus and the client apparatus.

The server apparatus assumes a screen (virtual screen) which is larger than a display screen of the client apparatus to generate screen information (virtual screen information). The client apparatus has a function for extracting partial screen information from the virtual screen information. The partial screen information (designated information) corresponds to a specific area (designated area) in the virtual screen. Moreover, the client apparatus includes a function for constantly displaying the designated information on a constant display area which is set on the display screen of the client apparatus.

Furthermore, the client apparatus includes a function for obtaining coordinate information at which the designated information should originally be displayed on the virtual screen (coordinate conversion processing). The client apparatus also includes a function of transmitting the obtained coordinate information to the server apparatus, when the user performs an operation within the constant display area on which the designated information is displayed.

An embodiment of a thin client system according to the present invention will now be described with reference to the accompanying drawings.

Figure 1:
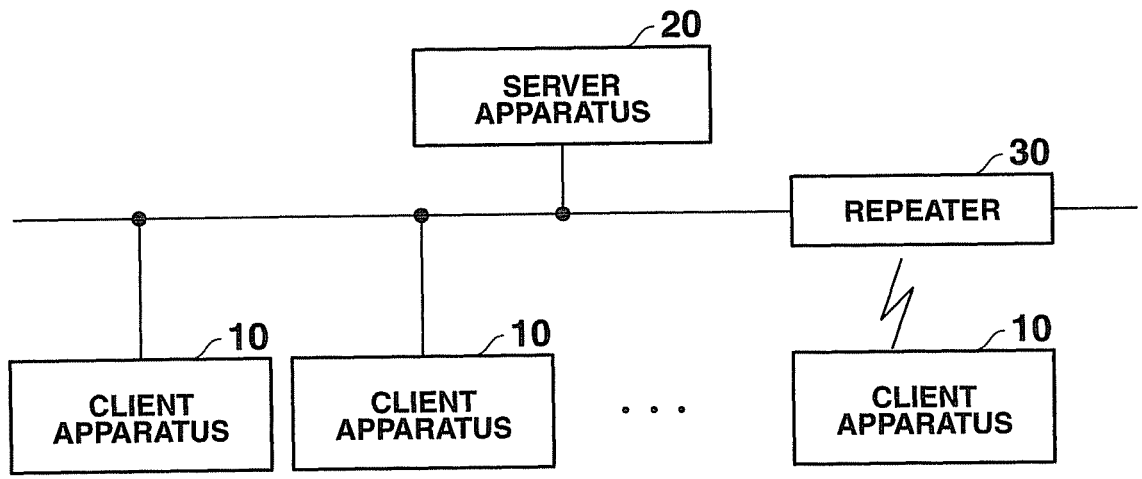
FIG. 1 is a view for schematically explaining a thin client system.

FIG. 1 is a view for schematically explaining a thin client system.

As shown in FIG. 1, a client apparatus 10 and a server apparatus 20 are connected with each other via a network (communication network) to form the thin client system. When communicating wirelessly, the client apparatus communicates with the server apparatus 20 via a repeater 30 and the network.

Figure 2:
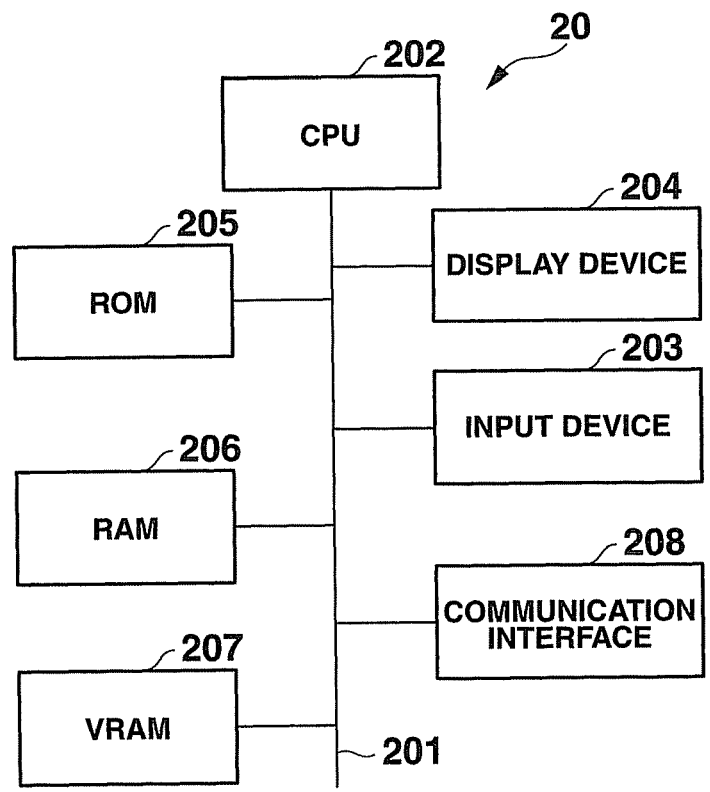
FIG. 2 is a schematic view showing a hardware configuration of a server apparatus 20.

FIG. 2 is a schematic view showing a hardware configuration of the server apparatus 20.

The server apparatus 20 includes a central processing unit (CPU) 202, an input device 203, a display device 204, a ROM 205, a RAM 206, a video RAM (VRAM) 207 and a communication interface 208. The above components of the server apparatus 20 are mutually connected via a bus 201. The CPU 202 controls operations of the components of the server apparatus 20. The input device 203 is operated so as to input a variety of data or signals. The display device 204 displays an image and other information. The ROM 205 stores programs to carry out various processing in the server apparatus 20 and a control program to control the functional components of the server apparatus 20. The VRAM 207 temporarily stores display data to be displayed on the display device 204. The communication interface 208 is an interface for connection with the network, such as a local area network (LAN).

Figure 3:
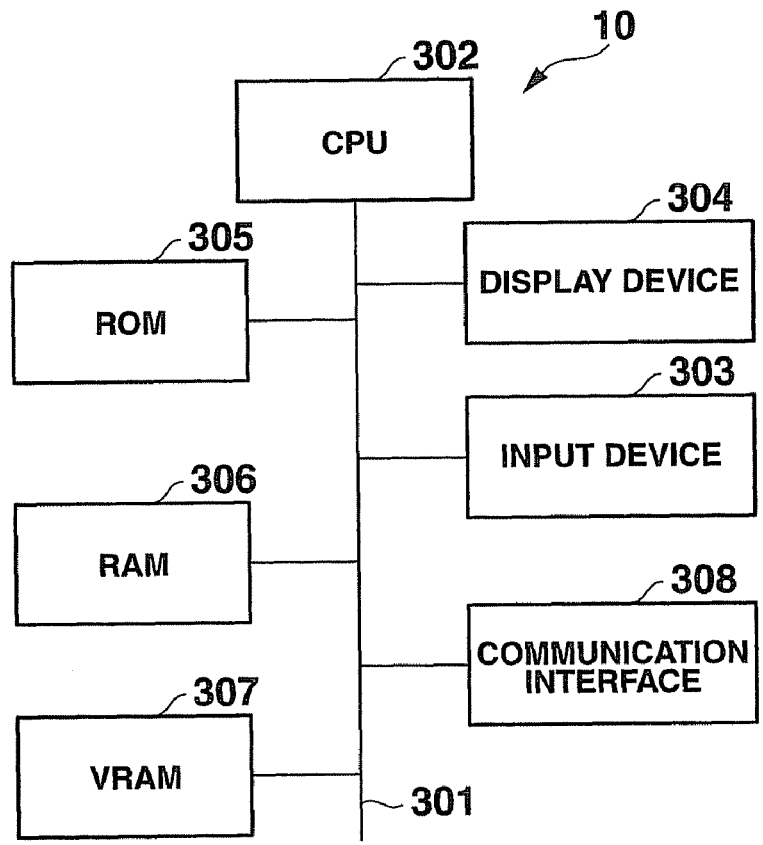
FIG. 3 is a schematic view showing a hardware configuration of a client apparatus 10.

FIG. 3 is a schematic view showing a hardware configuration of a client apparatus 10.

A CPU 302, an input device 303, a display device 304, a ROM 305, a RAM 306, a VRAM 307 and a communication interface 308 are mutually connected via a bus 301 to form the client apparatus 10. The CPU 302 controls operations of the components of the client apparatus 10. The input device 303 includes a keyboard and a pointing device such as a mouse. The input device 303 is operated to enter various data and signals. The display device 304 displays an image and other information. The ROM 305 stores programs to carry out various processing in the client apparatus 10 and a control program to control the functional components of the client apparatus 10. The VRAM 307 includes a display buffer for temporarily storing the display data to be displayed on the display device 304. The communication interface 308 is an interface for connection with a network such as a wireless LAN or a mobile-phone network.

An operation example of the present embodiment will be explained hereinafter.

Figure 4:
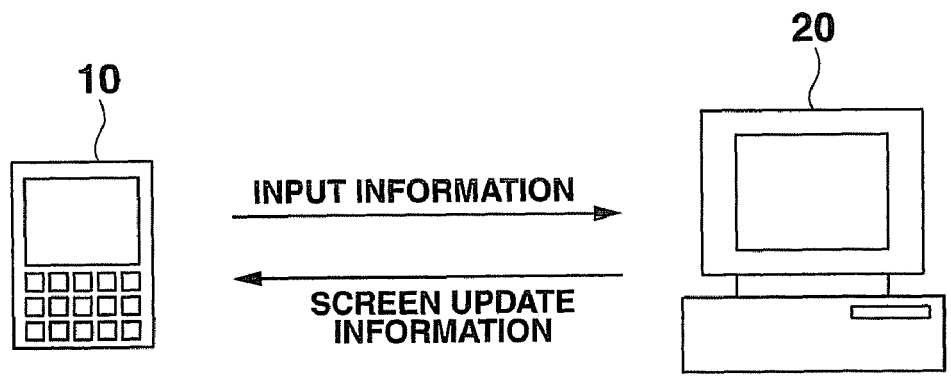
FIG. 4 is a view showing a configuration of the thin client system.

FIG. 4 is a view showing a configuration of the thin client system.

In the thin client system, as shown in FIG. 4, operation information corresponding to an operation performed by a user through the input device 303 (such as a keyboard and a mouse) of the client apparatus 10 is transferred to the server apparatus 20. The server apparatus 20 executes processing depending on the transferred operation information. The server apparatus 20 generates screen information (screen update information) by the execution of the processing, and sends the screen information to the client apparatus 10. The transferred screen information is reflected by the display device 304 of the client apparatus 10.

In the present embodiment, the server 20 creates screen information (virtual screen information) assuming that the virtual screen information will be displayed on a display screen (virtual screen) which is fairly large. However, size of the display screen of the display device 304 in the client apparatus 10 (client screen) is smaller than the size of the virtual screen. Therefore, the display device 304 displays the entire transferred virtual screen information by means of a scroll function.

Figure 5:
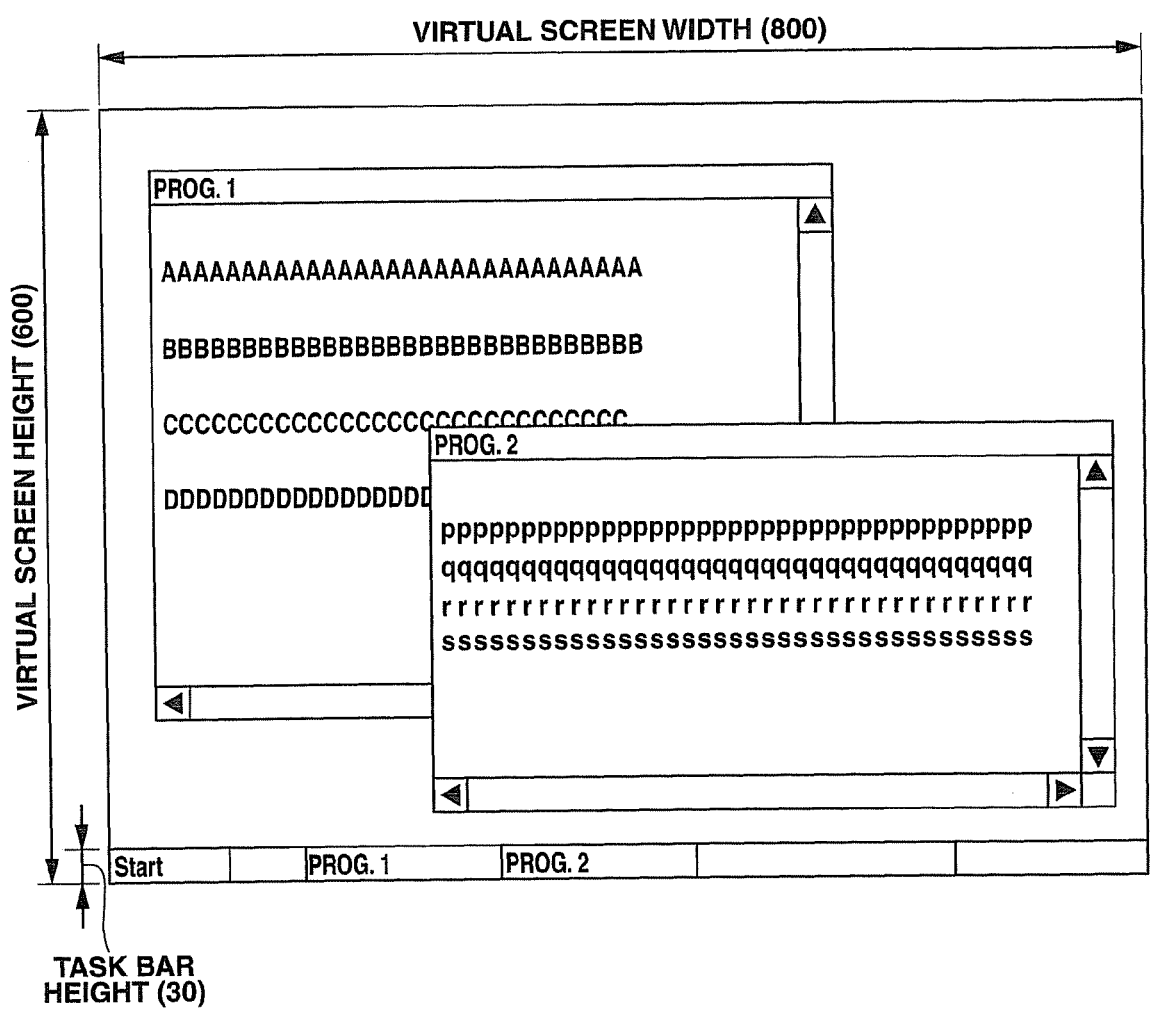
FIG. 5 is a view for explaining a virtual screen of the server apparatus 20.
Figure 6:
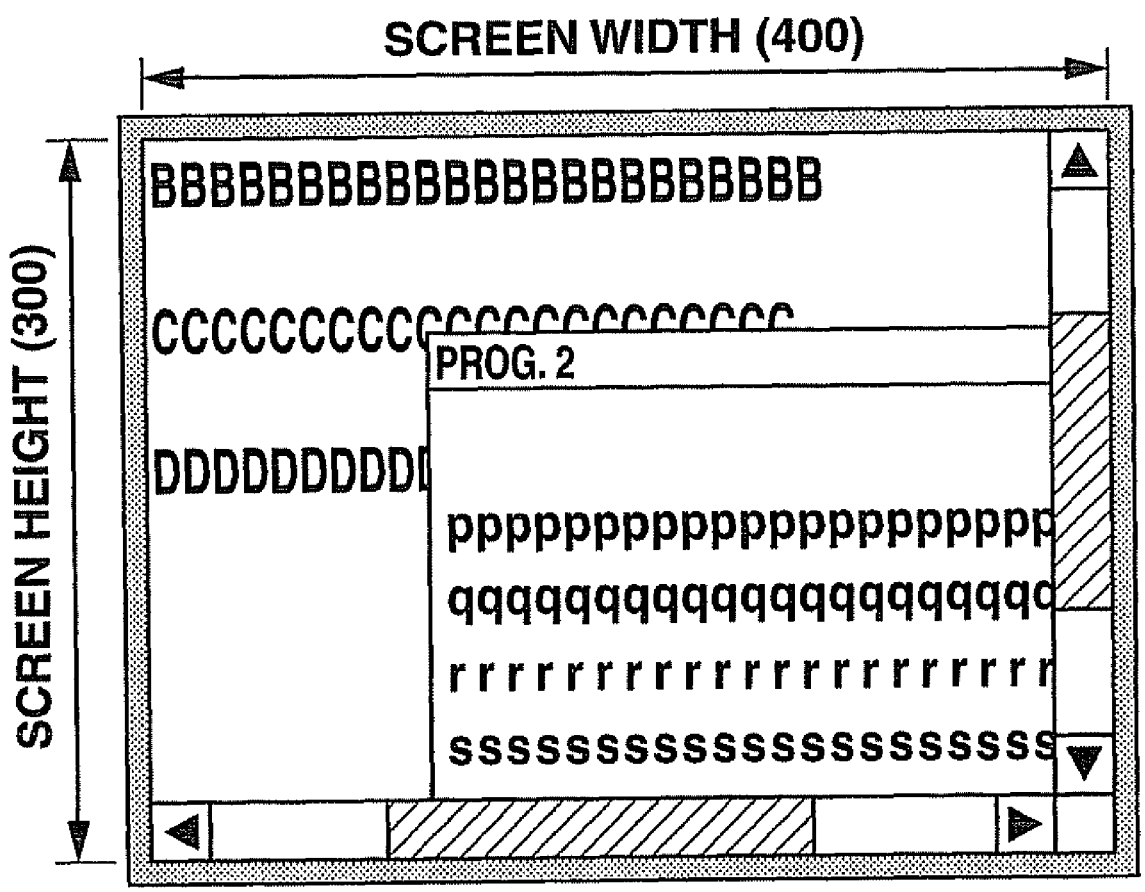
FIG. 6 is a view for explaining a client screen.

FIG. 5 is a view for explaining the virtual screen which the server apparatus 20 assumes when generating the screen information. FIG. 6 is a view for explaining the display screen (client screen) which belongs to the display device 304 of the client apparatus 10.

In the present embodiment, the server 20 is an ordinary personal computer, for example. As shown in FIG. 5, the server apparatus 20 includes the display screen having 800 pixels in width, and 600 pixels in height; and the server apparatus 20 generates virtual screen information assuming the virtual screen having the same size. The size of the display screen (client screen) belonging to the display unit 304 of the client apparatus 10 is 400 pixels in width and 300 pixels in height as shown in FIG. 6. That is, the width and the height of the client screen are halves of the width and the height of the virtual screen. As shown in FIG. 5, a height of the task bar on the virtual screen is 30 pixels. An origin of coordinates is the upper left of the virtual screen, X direction indicates the horizontal direction, and Y direction indicates the vertical direction. A unit of the coordinate system on the virtual screen is a pixel.

The virtual screen information contains display information of the task bar. A variety of function buttons are arranged on the task bar, including a start button, a button indicating a file or a folder in use, a variety of indicators and a language bar. An operation of a function button on the task bar enables readily execution of corresponding application.

When the virtual screen information is transferred from the server apparatus 20, the client screen indicates a screen based on the virtual screen information. The client screen is smaller than the virtual screen; accordingly the entire virtual screen information cannot be displayed. As shown in FIG. 6, depending on the display status of the client screen, the task bar may not be displayed thereon. In the case in which the task bar is not displayed, the user should perform a scroll operation to use the task bar. Thereby, the original effectiveness of the task bar function is reduced.

Therefore, described in detail below is a display method of setting a constant display area on the client screen, and constantly displaying screen information corresponding to a designated area (task bar) of the virtual screen on the set constant display area.

Figure 18:
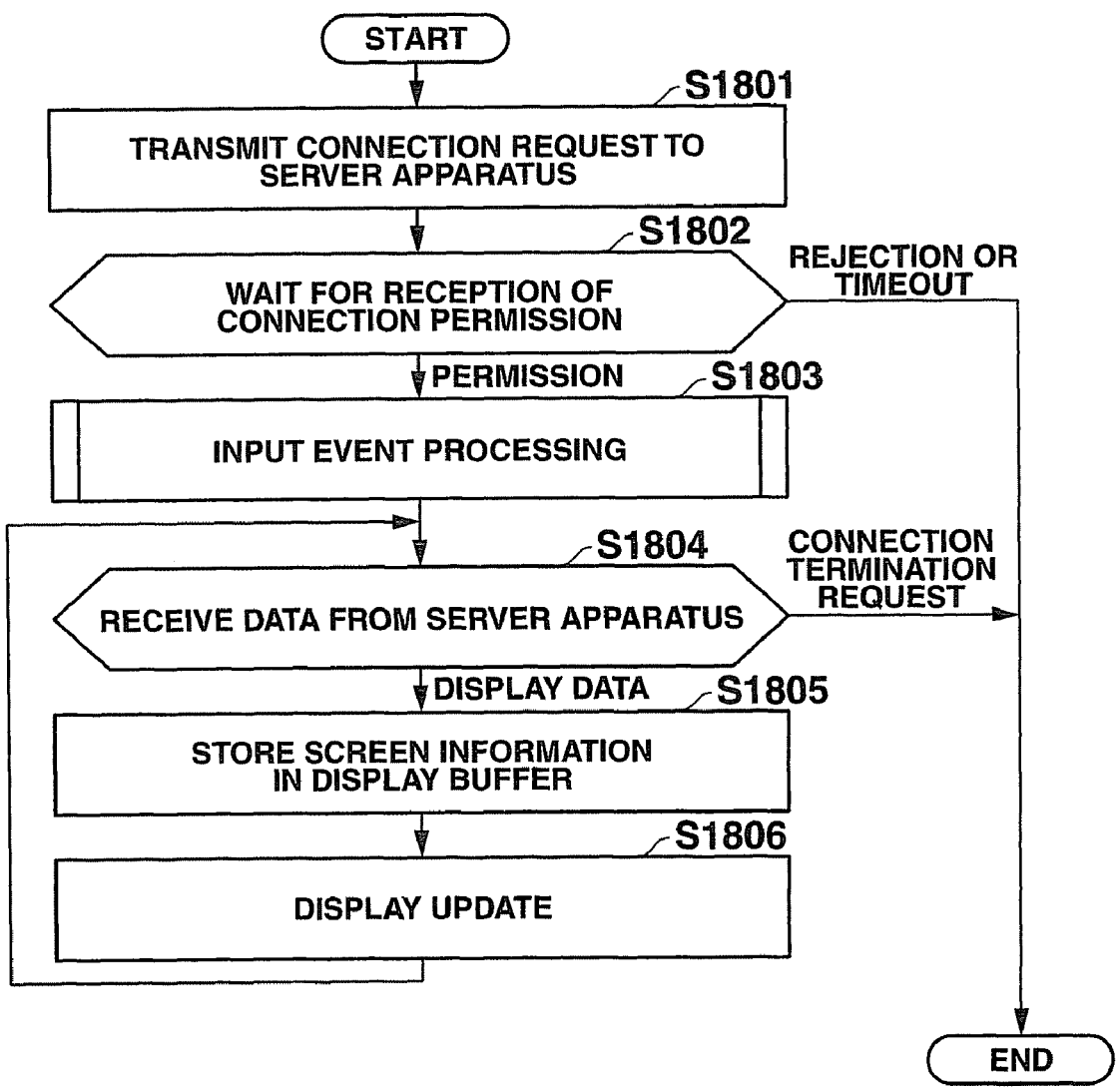
FIG. 18 is a flowchart of ordinary client processing executed by the client apparatus 10.

FIG. 18 is a flowchart illustrating ordinary client processing executed by the client apparatus 10.

The client apparatus 10 transmits a connection request signal to the server apparatus 20 (step S1801), and waits for the server apparatus 20 to send a connection permission signal (step 1802).

Figure 19:
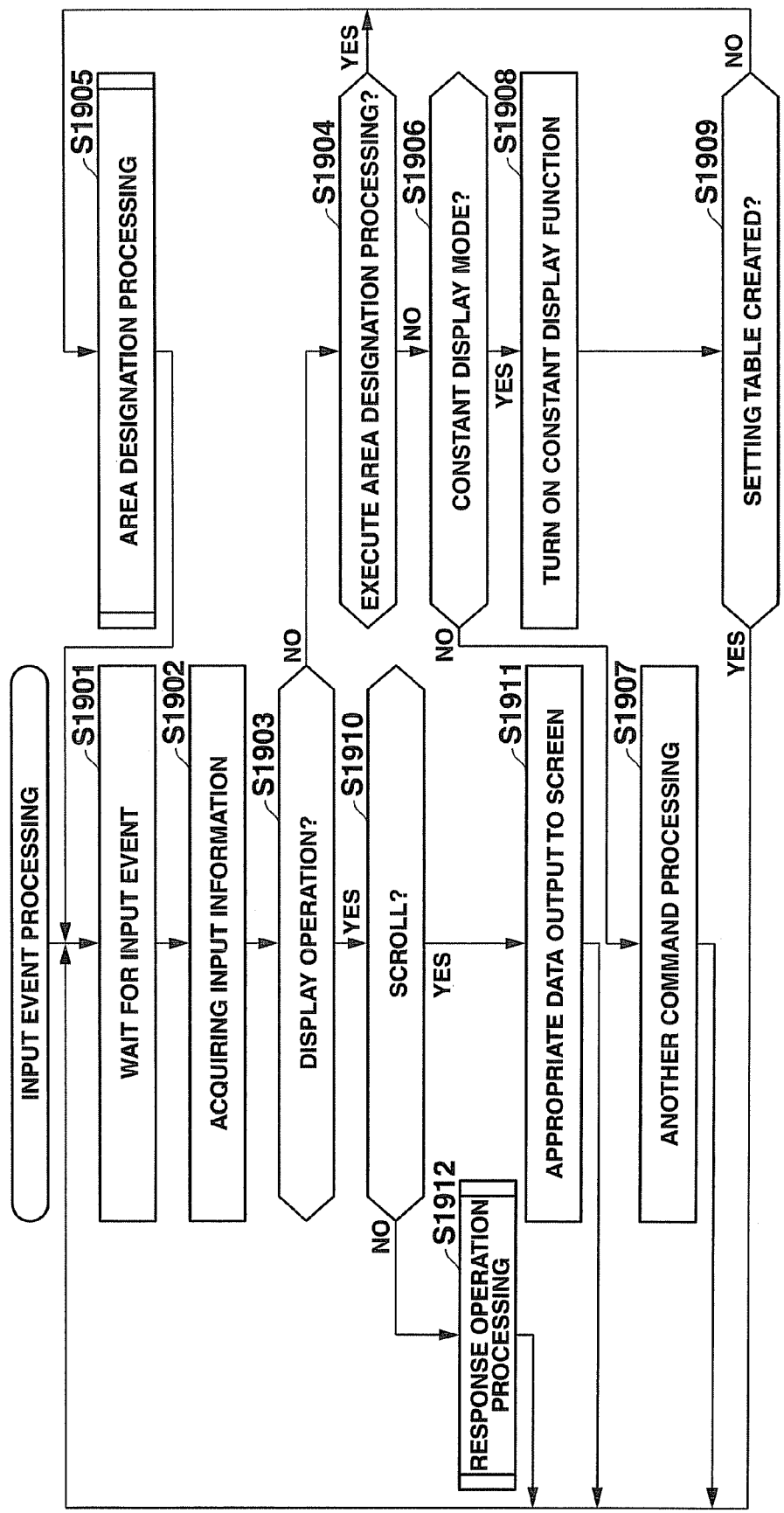
FIG. 19 is a flowchart of input event processing executed by the client apparatus 10.

When a predetermined time elapses (time out), or when the server apparatus 20 rejects the connection request ("rejection" or "time out" in step S1802), the client apparatus 10 terminates the client processing. When the server 20 permits the connection request ("permission" in step S1802), input event processing shown in FIG. 19 is executed (step S1803). In the input event processing, the client apparatus 10 transmits an input operation signal to the server apparatus 20 in response to an input operation by the user. The server apparatus 20 performs processing corresponding to the received input operation signal and transmits a reply signal to the client apparatus 10.

The client apparatus 10 receives the reply signal transmitted from the server apparatus 20 (step S1804). When it is determined that the received reply signal instructs the termination of the connection ("connection termination request" in step S1804), the client 10 terminates the client processing. When the received reply signal is a screen information signal transmitted in step S2210 of after-mentioned server processing (refer to FIG. 22) ("display data" in step S1804), the client apparatus 10 stores the received screen information signal in a display buffer provided in the VRAM 307 (step S1805). The CPU 302 updates the display of the client screen on the basis of the received screen information (step S1806). Then the flow returns to step S1804.

Figure 22:
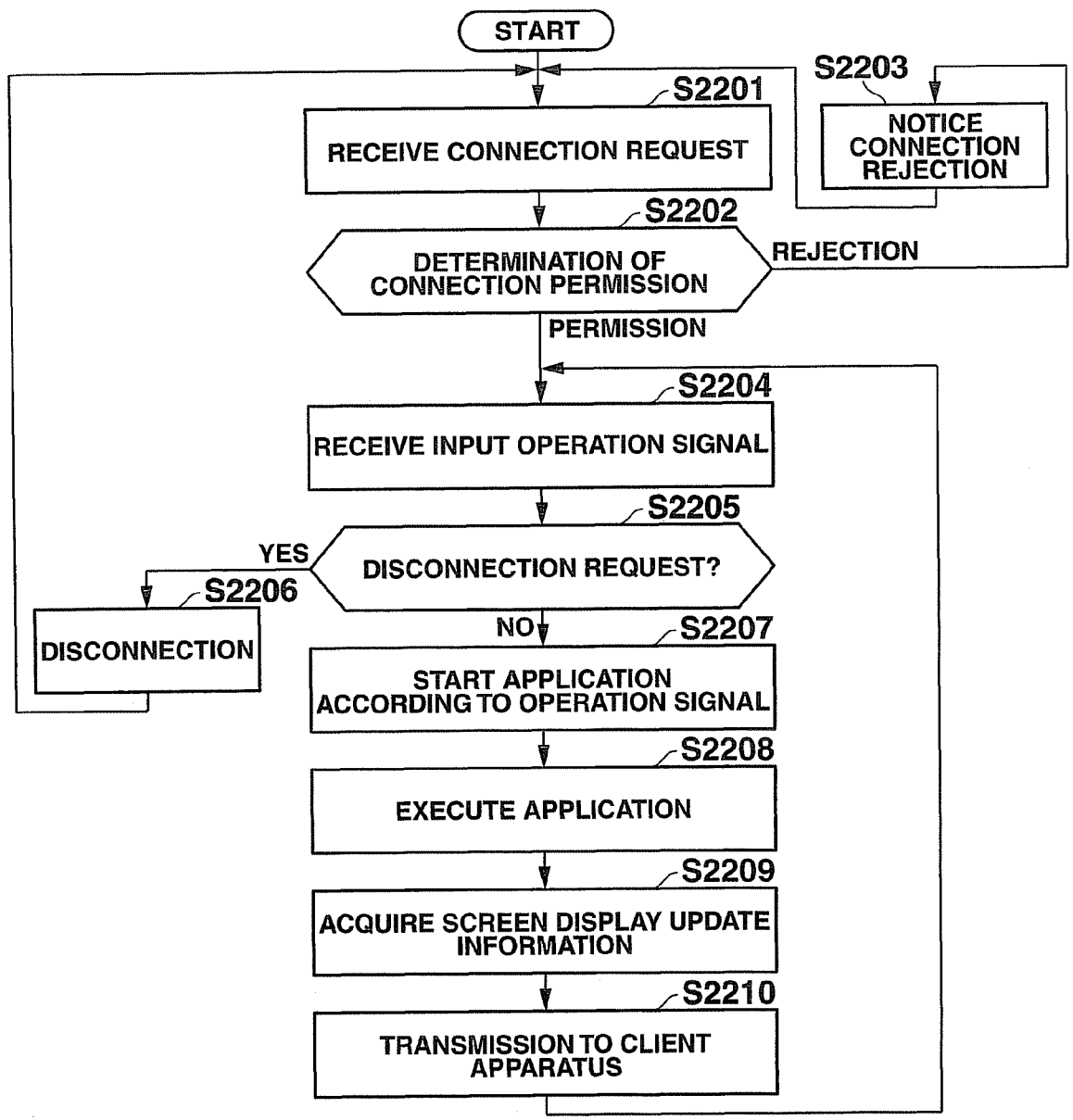
FIG. 22 is a flowchart of ordinary server processing executed by the server apparatus 20.

FIG. 22 is a flowchart depicting ordinary server processing executed by the server apparatus 20.

When the client apparatus 10 transmits the connection request signal in step S1801 of FIG. 18, the server apparatus 20 receives the connection request signal (step S2201). On receiving the connection request signal, the CPU 202 determines whether to permit the connection request from the client apparatus 10 or not (step S2202).

When the CPU 202 determines not to permit the connection request ("rejection" in step S2202), the server apparatus 20 sends a rejection note of the connection to the client apparatus 10 (step S2203), then the flow returns to step S2201.

When the CPU 202 determines to permit the connection request ("permission" in step S2202), the server apparatus 20 receives the input operation signal (step S2204) which the client apparatus 10 sends in step S1803 (input event processing) of the foregoing client processing (refer to FIG. 18). When the input operation signal transmitted from the client apparatus 10 is a disconnection request signal ("Y" in step S2205), the server apparatus 20 disconnects data connection with the client apparatus 10 (step S2206), then the flow returns to step S2201.

When it is determined that the input operation signal transmitted from the client apparatus 10 is not the disconnection request signal ("N" in step S2205), the CPU 202 starts an application program corresponding to the input operation signal (step S2207).

The CPU 202 executes the application program corresponding to the input operation signal (step S2208) and generates screen information (screen update information) (step S2209).

The CPU 202 transmits the screen information signal to the client apparatus 10 (step S2210), then the flow returns to step S2204.

The screen information transmitted in step S2210 is received by the client apparatus 10 in step S1804 of the foregoing client processing (refer to FIG. 18). The client apparatus 10 causes the display device 204 to display the screen based on the received screen information by the processing of steps S1805 and S1806.

FIG. 19 is a flowchart of the input event processing executed by the client apparatus 10. The input event processing corresponds to the processing of step S1803 in the aforementioned client processing (refer to FIG. 18).

The CPU 302 of the client apparatus 10 waits for the user to operate the input device 303 (input event) (step S1901). When the user operates the input device 303, the CPU 302 acquires operation information corresponding to the content of the operation by the user (step S1902).

The CPU 302 determines whether or not the acquired operation information is an instruction to perform display operation (step S1903). When the acquired operation information is an instruction to perform the display operation ("Y" in step S1903), the CPU 302 determines whether or not execution of scroll processing is instructed (step S1910). When it is determined that the execution of the scroll processing is instructed ("Y" in step S1910), the CPU 302 reads the screen information corresponding to the scroll instruction made by the user from the display buffer provided in the VRAM 307, and displays the read screen information on the display screen of the display device 304 (step S1911). Thereafter, the flow returns to step S1901. Conversely, when it is determined that the execution of the scroll processing is not instructed ("N" in step S1910), the CPU 302 executes response operation processing to be described below (refer to FIG. 21) (step S1912), then the flow returns to step 1901.

When it is determined that the operation information acquired at step S1902 does not instruct to perform the display operation ("N" in step S1903), the CPU 302 determines whether or not the acquired operation information is an instruction to start area designation processing (step S1904). When the operation information instructs to start the area designation processing ("Y" in step S1904), the CPU 302 executes the area designation processing to be mentioned later (step S1905) (refer to FIG. 20), then the flow returns to step S1901.

When it is determined that the operation information acquired at step S1902 does not instruct to start the area designation processing ("N" in step S1904), the CPU 302 determines whether or not the operation information instructs to set a constant display mode (step S1906). When it is determined that the operation information instructs to set the constant display mode ("Y" in step S1906), the CPU 302 activates a constant display function (step S1908), and determines whether or not a setting table is prepared (step S1909). When it is determined that the setting table is not prepared ("N" in step S1909), the CPU 302 executes the area designation processing shown in FIG. 20 (step S1905), then the flow returns to step S1901. When it is determined that the setting table is prepared ("Y" in step S1909), the flow returns to step S1901.

When the operation information acquired at step S1902 does not give any instruction for performing the display operation, for starting the area designation processing or for setting the constant display mode ("N" in steps S1903, S1904 and S1906), the CPU 302 executes other command processing in response to the operation information (step S1907), then the flow returns to step S1901.

Figure 20:
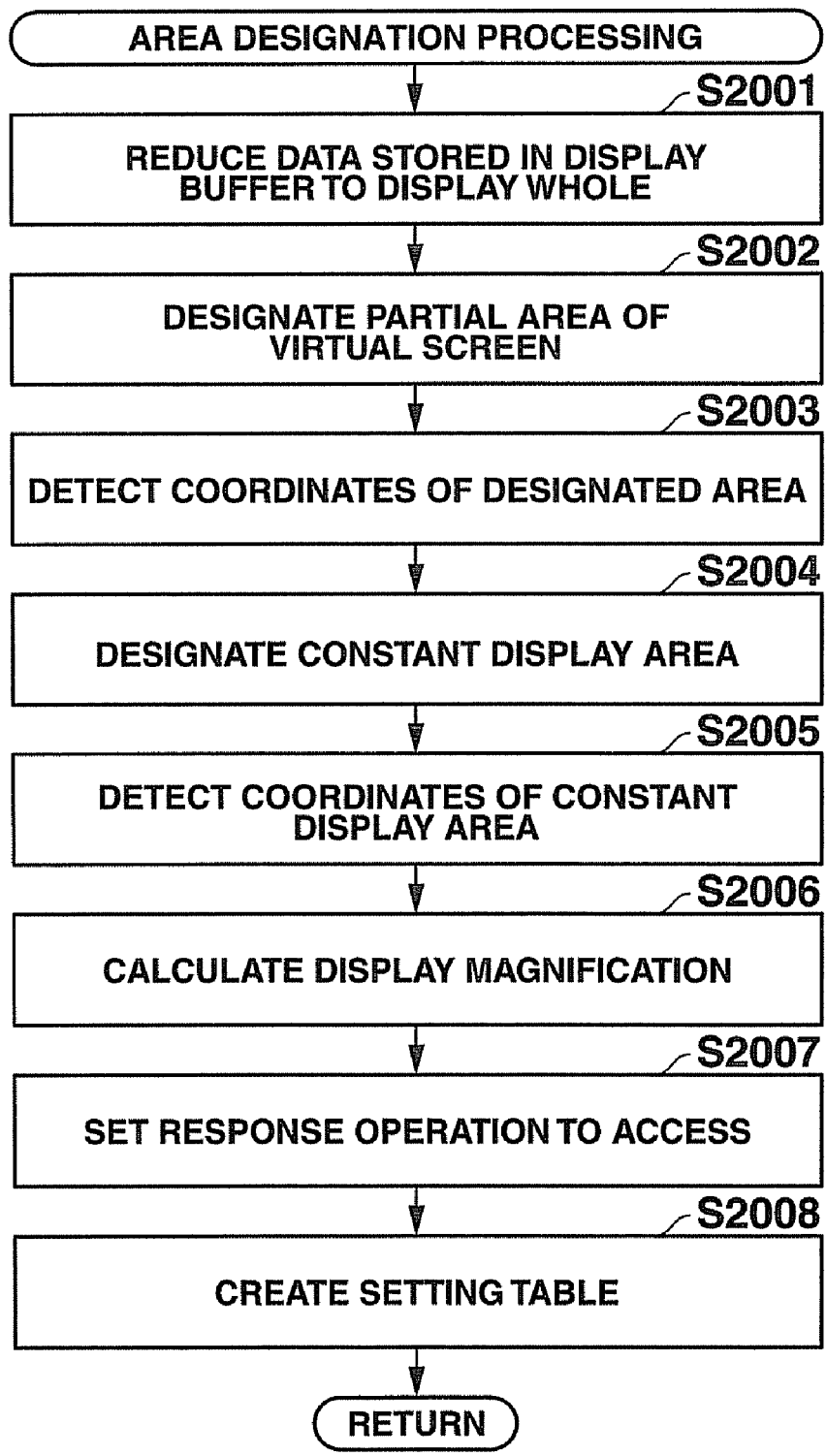
FIG. 20 is a flowchart of area designation processing executed by the client apparatus 10.

FIG. 20 is a flowchart of the area designation processing executed by the client apparatus 10. The area designation processing is executed when the user operates the input device 303 of the client apparatus 10 to instruct the start of the area designation processing ("Y" in step S1904) in the input event processing shown in FIG. 19. By means of the area designation processing, the user may designate an area which the user desires to constantly display on the client screen (the area is referred to as a designated area) in the virtual screen. The virtual screen is the screen which the server apparatus 20 assumes when generating the screen information.

The virtual screen information, which is generated by the server apparatus 20 on the assumption that the virtual screen information is displayed on the virtual screen, is sent to the client apparatus 10 and stored in the display buffer provided in the VRAM 307.

The virtual screen information stored in the display buffer is displayed on the client screen in a reduced size in order that the entire virtual screen may be displayed (step S2001). As shown in FIGS. 5 and 6, in the present embodiment, the client screen can display only a quarter pixels of the virtual screen. Therefore, the CPU 302 halves the size of the virtual screen information both in width and height so that the whole virtual screen may be displayed on the client screen.

Figure 7:
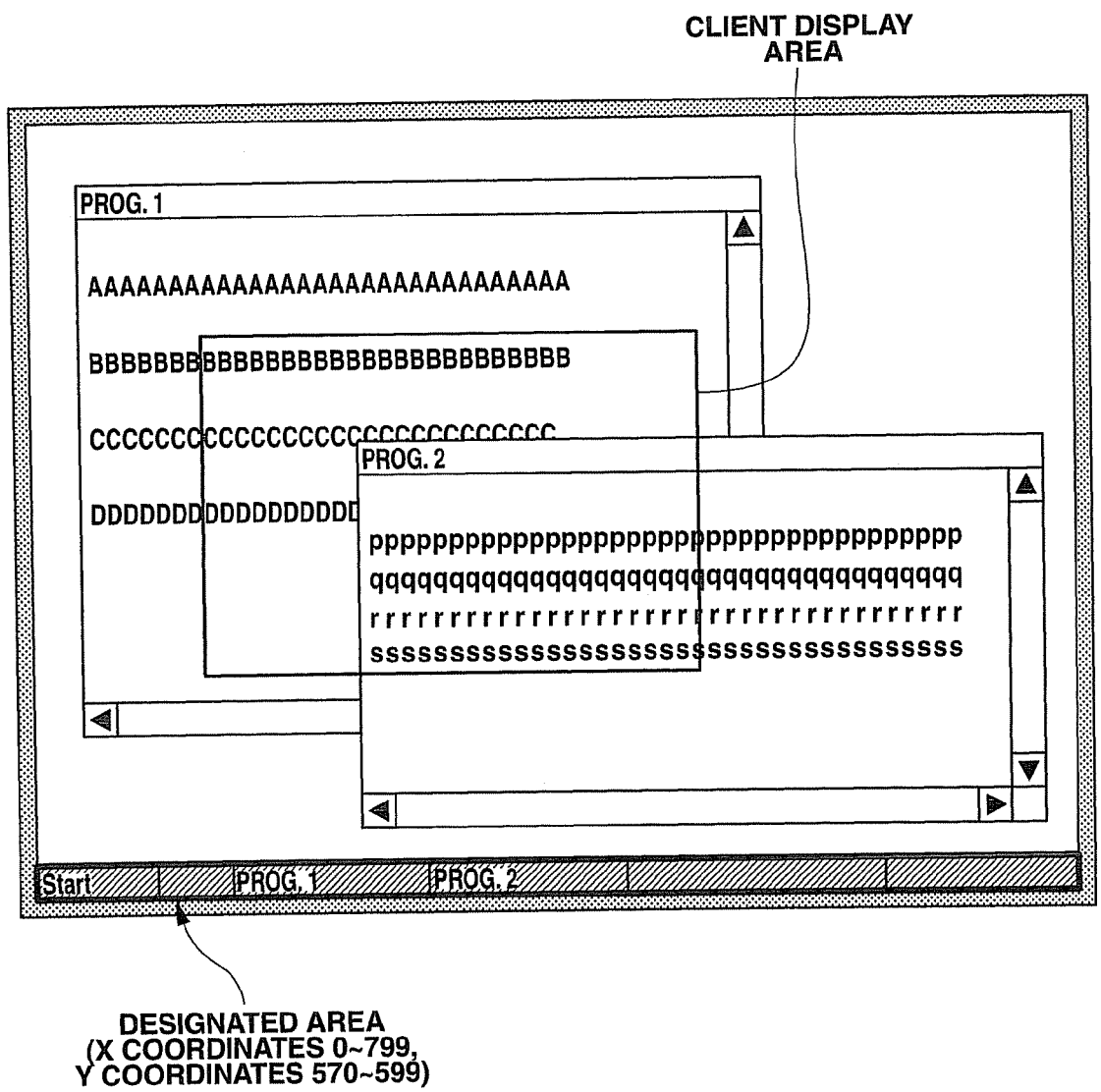
FIG. 7 is a view for explaining designation of a partial area on the virtual screen.

The user designates, as shown in FIG. 7, a partial area (designated area) on the reduced and displayed virtual screen by operating the pointing device such as a mouse of the input device 303 (step S2002). The CPU 302 detects the coordinate information of the designated area (step S2003). As shown in FIG. 7, the coordinate information of the designated area is detected as follows: "X coordinates: 0-799 pixels, Y coordinates: 570-599 pixels (area of 800 pixels in width and 30 pixels in height)". Hereinafter, the virtual screen information corresponding to the designated area is referred to as designated information.

Figure 8:
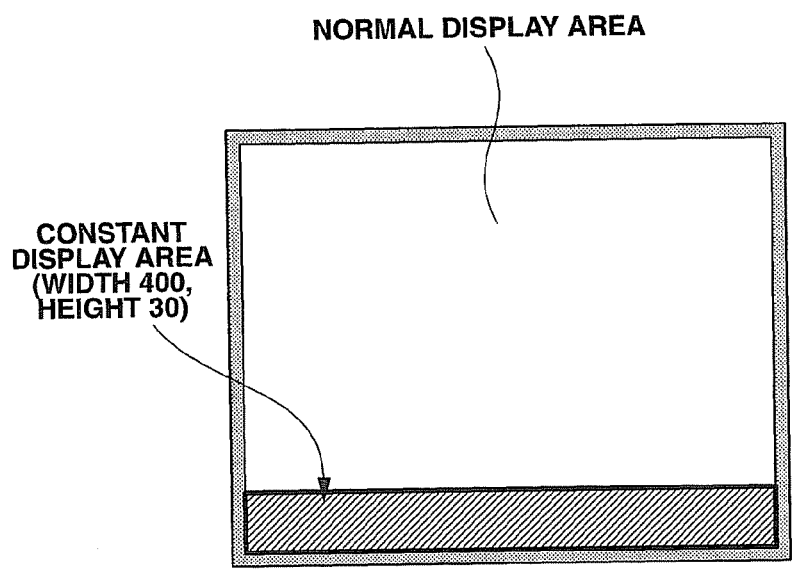
FIG. 8 is a view for explaining designation of a constant display area.

Consequently, the user may designates an area (constant display area), in which the designated information is constantly displayed, on the client screen by means of the pointing device such as a mouse (step S2004), as shown in FIG. 8. The CPU 302 detects the coordinate information of the area designated by the user as the constant display area (step S2005). In FIG. 8, the area having "400 pixels in width and 30 pixels in height" is designated as the constant display area.

Sequentially, display magnification is obtained for displaying the designated information in the designated constant display area (step S2006). The user may designate, in advance or in step S2006, whether to display the designated information as it is or in reduced size in the constant display area. The display magnification is set based on the designation made by the user. For example, as shown in the example of FIGS. 7 and 8, when the user sets that the entire designated information should be displayed, the display magnification results in 0.5 in the X direction, and 1 in the Y direction. The designated information is reduced on the basis of the set display magnification to be displayed in the constant display area.

Figure 9:
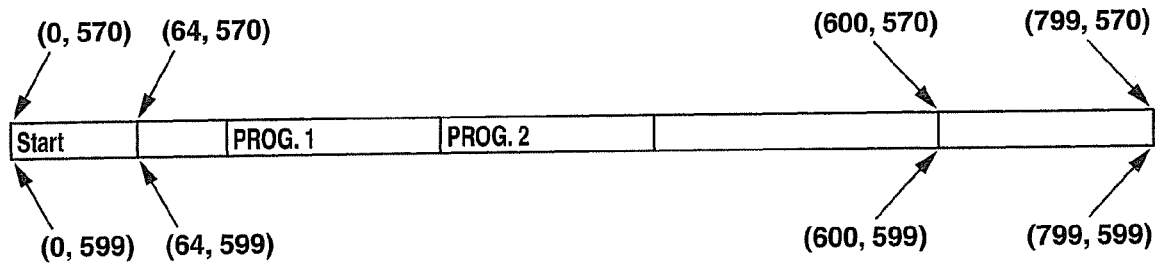
FIG. 9 is a view for explaining response operation to access by a user.

Consequently, a response operation is set (step S2007). The set response operation is performed in response to access to the constant display area by the user. As shown in FIG. 9, rectangular areas are arranged in the designated area. For each rectangular area, a response operation is set so that the response operation is executed when the user accesses to the rectangular area (for example, a click operation by means of the pointing device such as the mouse of the input device 303). The setting of a response operation is performed as follows. That is, the display device 304 of the client apparatus 10 displays guidance for the setting under the control of the CPU 302. Then, the user inputs the response operation by the input device 303 with reference to the displayed guidance. The CPU 302 executes processing according to the input data to set the input response operation.

Figure 10:
FIG. 10 is a view showing a setting table of the constant display area according to the first embodiment.

The response operation, which is set for each rectangular area by the user, is stored in the setting table depicted in FIG. 10 (step S2008). The setting table is provided in the RAM 306 of the client apparatus 10.

Figure 21:
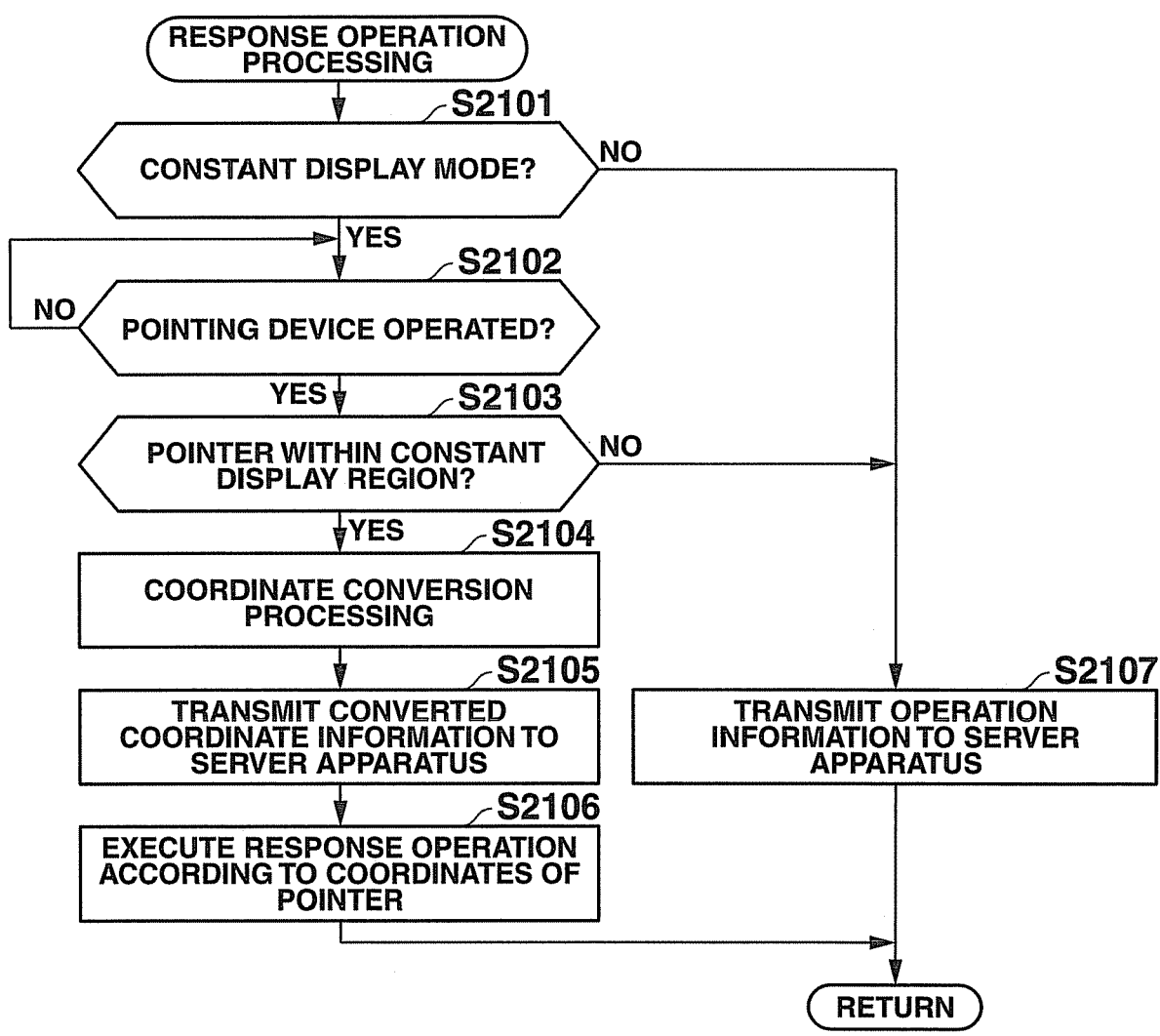
FIG. 21 is a flowchart of response operation processing executed by the client apparatus 10.

In the after-mentioned response operation processing (refer to FIG. 21), when the user accesses (click operation, etc.) to the constant display area by use of the pointing device such as a mouse, the CPU 302 obtains coordinates of the point, which a pointer of the pointing device indicates, on the virtual screen by coordinate conversion processing (step S2104 of the response operation processing shown in FIG. 21). The converted coordinates are transmitted to the server apparatus 20 (step S2105 of the response operation processing shown in FIG. 21). The response operation is executed based on the setting of the rectangular area including the converted coordinates (step S2106 of the response operation processing shown in FIG. 21). In an example shown in FIGS. 9 and 10, in the case where the user accesses to the leftmost rectangular area (rectangular area in which the end points (0, 570) and (64, 599) make the diagonal line thereof) or the rightmost rectangular area (rectangular area in which the end points (600, 570) and (799, 599) form the diagonal line thereof), it is set that the client apparatus 10 performs the above-described coordinate conversion processing and transmission of the converted coordinates. Moreover scroll processing of the screen is set as a response operation.

In the case where the user accesses to the rectangular area in which a diagonal line is formed by the points (65, 570) and (599, 599), it is set that the client apparatus 10 merely performs the coordinate conversion processing and the transmission of the converted coordinates.

The setting table created in step S2008 is stored in the RAM 306 together with connection information such as a media access control (MAC) address, a log-in name and a virtual screen size of the server apparatus 20, for specifying a destination apparatus.

At the time of subsequent connection, when it is determined based on the above connection information that the client apparatus 10 is connected with the same server apparatus 20, the setting table is not newly set and the client apparatus 10 can utilize the setting table shown in FIG. 10.

When the above processing is finished, the flow returns to step S1910 of the input event processing shown in FIG. 19.

Figure 12:
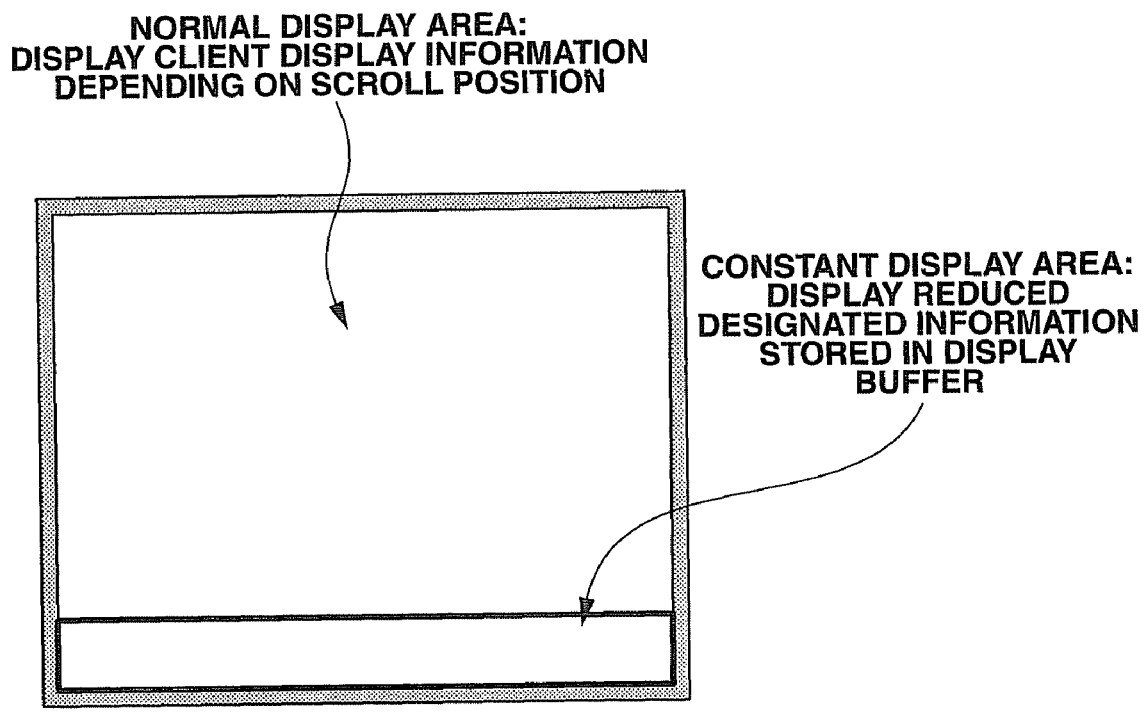
FIG. 12 is a view showing a display area of the client screen.

The area designation processing described above divides the display area of the client screen into two rectangular areas (normal display area and constant display area) shown in FIG. 12.

Figure 23:
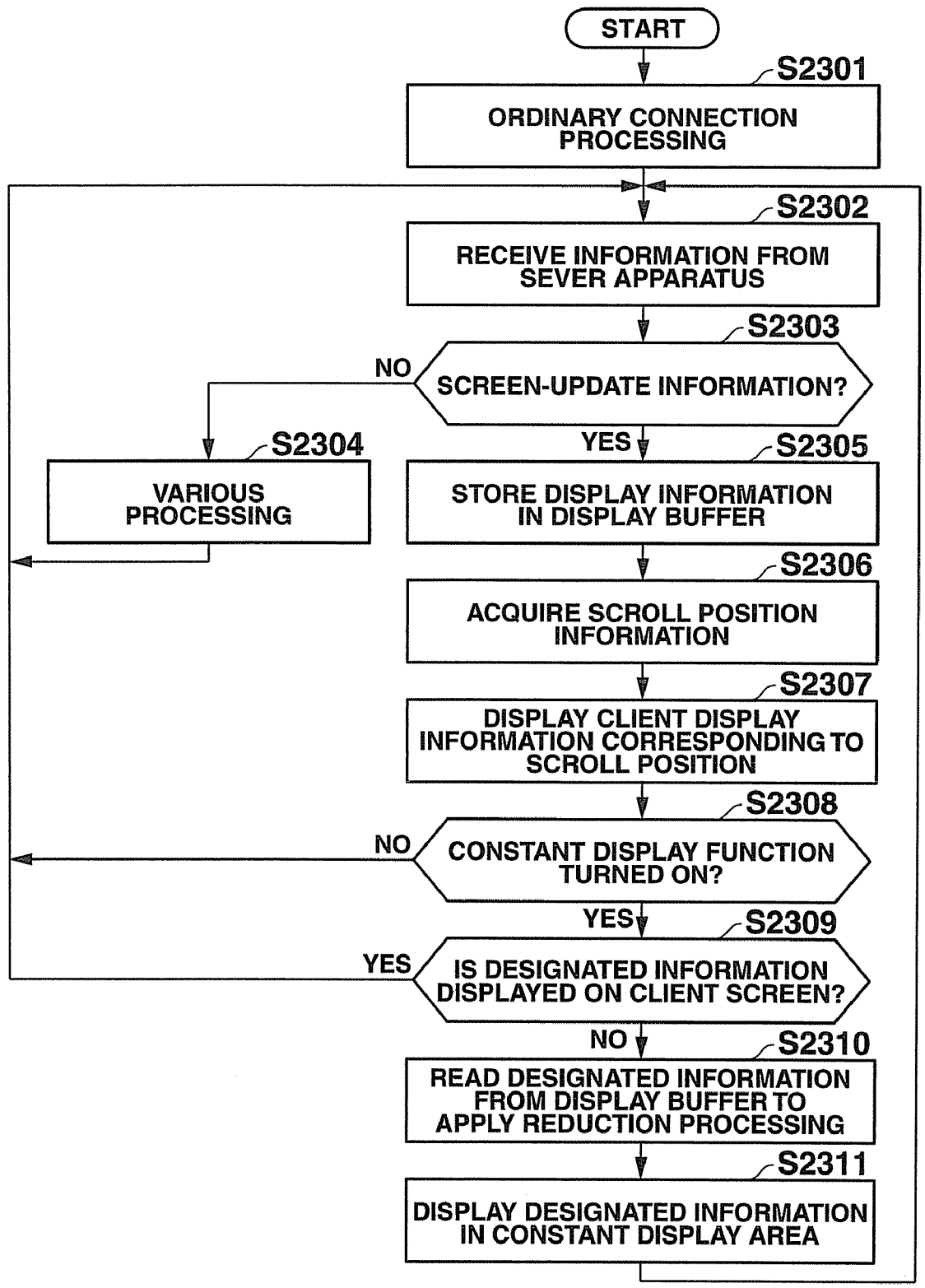
FIG. 23 is a flowchart of data reception and display processing according to the first embodiment.

FIG. 23 is a flowchart illustrating data reception and display processing executed by the client apparatus 10.

In the present embodiment, the client apparatus 10 transmits input operation information to the server apparatus 20 in response to the input operation performed by the user through the input device 303 (step S1803 in FIG. 18). The server apparatus 20 executes an application program corresponding to the input operation information to generate screen information, and transmits the generated screen information to the client apparatus 10 (steps S2204 to S2210 in FIG. 20). The client apparatus 10 displays the received screen information on the display screen of the display device 304 (steps S1804 to S1806 of FIG. 18). The processing of steps S2302 to S2311 to be described below explains the processing of steps S1804 to S1806 in the above client processing in further detail.

The client apparatus 10 transmits a connection request signal to the server apparatus 20, and when the server apparatus 20 permits the connection request ("ordinary connection processing" in step S2301), the client apparatus 10 receives information transmitted from the server apparatus 20 (step S2302). The CPU 302 of the client apparatus 10 determines whether or not the received information is screen information (screen update information) for updating the display screen of the display device 304 (step S2303). When it is determined that the received information is not the screen information ("N" in step S2303), processing corresponding to the received information is executed (step S2304), then the flow returns to step 2302. When it is determined that the received information is the screen information ("Y" in step S2303), the display buffer in the VRAM 307 stores the screen information (step S2305).

The CPU 302 detects scroll position information on the basis of the screen information received from the server apparatus 20 (step S2306). Based upon the detected scroll position information, the CPU 302 extracts partial screen information to be displayed on the display screen (client display information) from the virtual screen information stored in the display buffer, and the extracted client display information is displayed on the client screen (step S2307). Namely, from the virtual screen depicted in FIG. 7, an area (client display area) having the same size as the size of the client screen is extracted based on the detected scroll position information. The extracted area is displayed on the client screen.

The CPU 302 determines whether or not the constant display mode is set (step S2308). When it is determined that the constant display mode is not set ("N" in step S2308), the flow returns to step S2302. Conversely, when it is determined that the constant display mode is set ("Y" in step S2308), the CPU 302 determines whether or not the designated information (partial portion of the virtual screen information; corresponding to the designated area designated in step S2002 of FIG. 20) is displayed on the client screen (step S2309).

When it is determined that the designated information is displayed on the client screen ("Y" in step S2309), the flow returns to step S2302. On the other hand, when it is determined that the designated information is not displayed on the client screen ("N" in step S2309), the CPU 302 extracts the designated information from the virtual screen information stored in the display buffer and reduces the extracted designated information (step S2310). The reduction is performed on the basis of the display magnification stored in the setting table (refer to FIG. 10). The reduced designated information is displayed in the constant display area on the client screen (step S2311), then the flow returns to step S2302.

Figure 11:
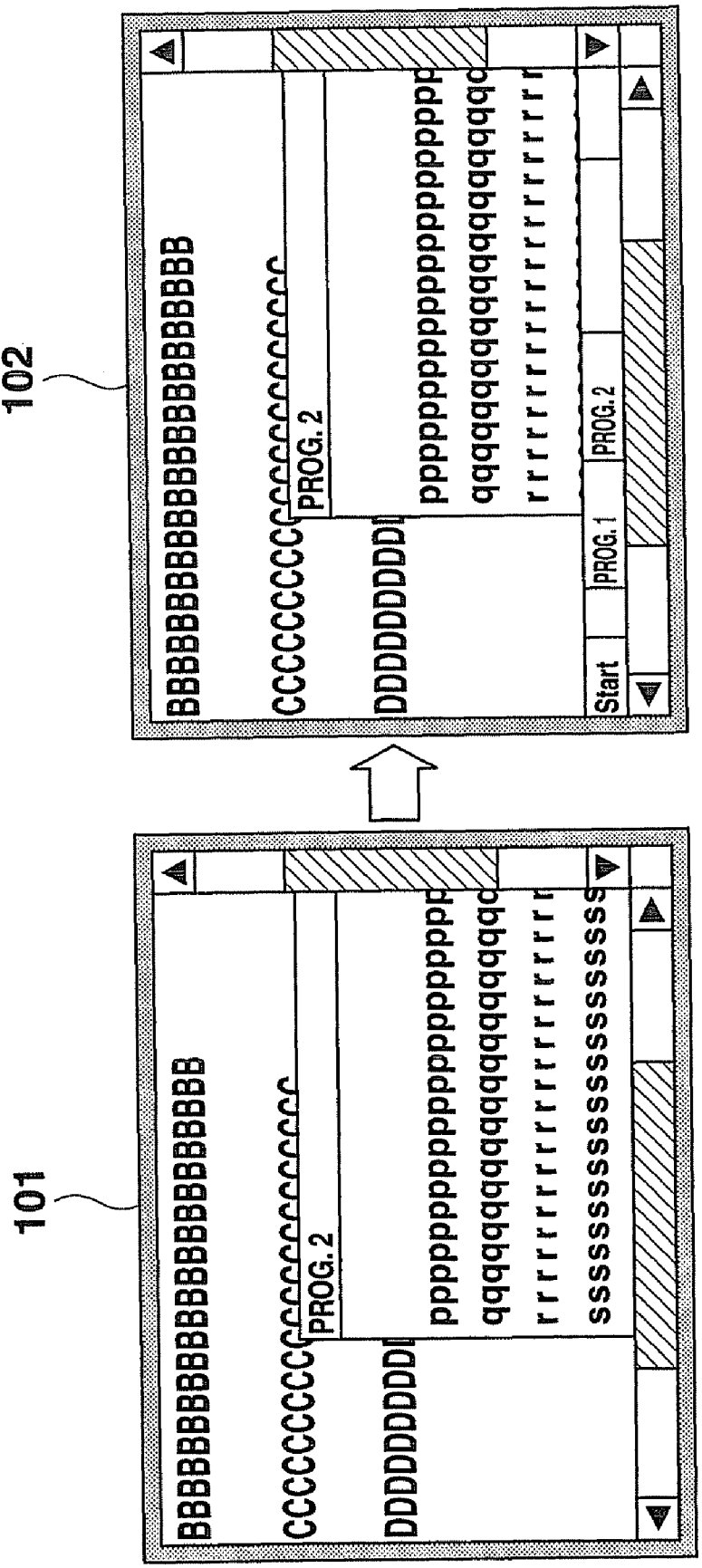
FIG. 11 is a view showing an example of switching from a normal mode to a constant display mode.

In the setting table shown in FIG. 10, for example, a rectangular area of "X coordinates: 0-799 pixels, Y coordinates: 570-599 pixels" is set as the designated area on the virtual screen. A rectangular area of "X coordinates: 0-399 pixels, Y coordinates: 270-299 pixels" (the lower rectangular area in the client screen shown in FIG. 12) is designated on the client screen as the constant display area. Therefore, in the case where the constant display mode is set, the client screen is divided into the normal display area (the upper rectangular area in the client screen shown in FIG. 12) and the constant display area. The foregoing client display information is shortened in a vertical direction by height of the constant display area and displayed in the normal display area. The CPU 203 reads partial information (designated information) corresponding to the designated area from the virtual screen information stored in the display buffer. The CPU 302 reduces the read designated information based on the display magnifications (0.5 in X direction, 1 in Y direction) stored in the setting table, and displays the reduced designated information in the constant display area of the client screen. Therefore, in the case where it is determined in step S2308 that the constant display mode is set, the display state changes from the display state 101 of the ordinary mode to the display state 102 of the constant display mode as shown in FIG. 11, for example.

Figure 13:
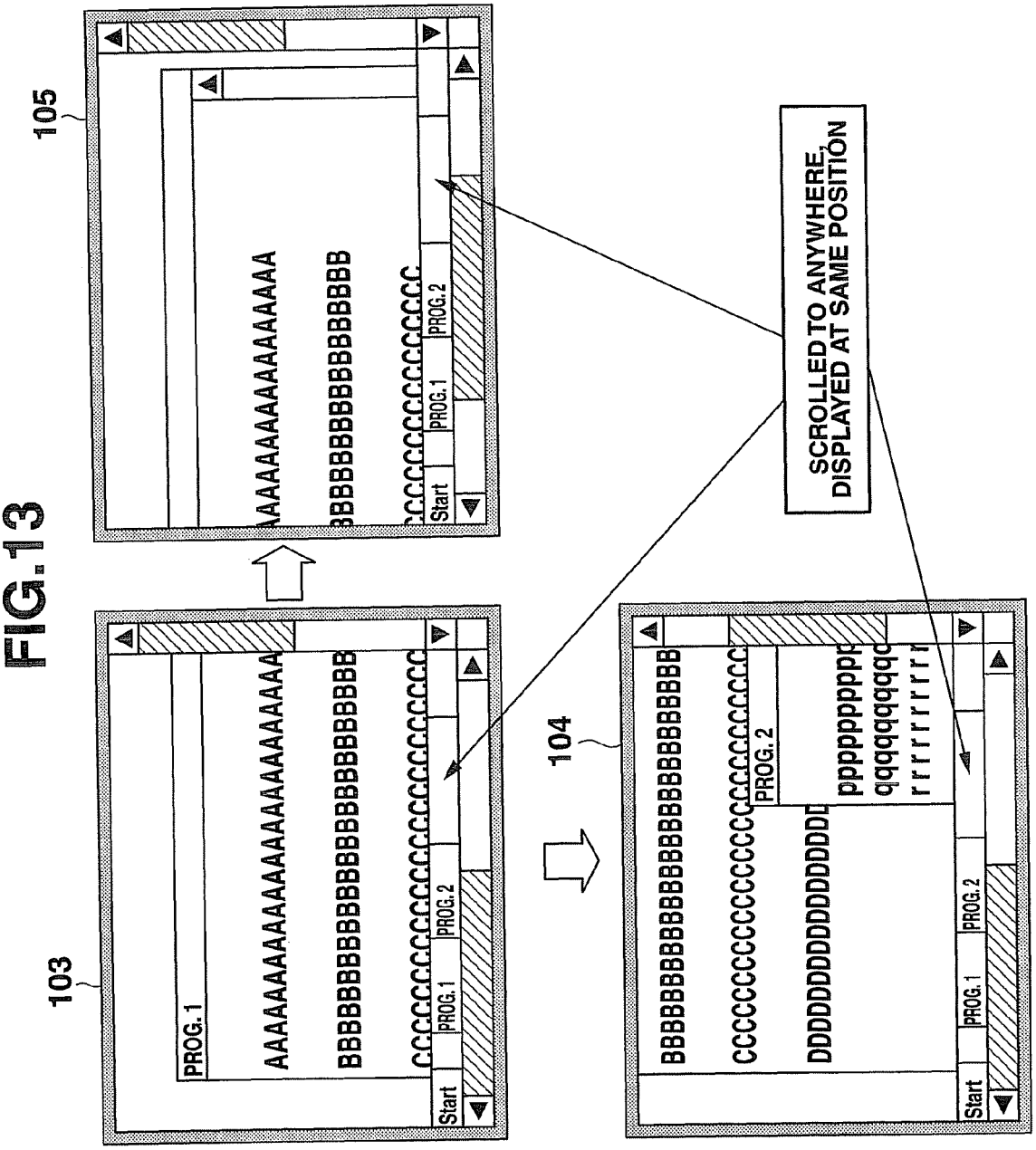
FIG. 13 is a view showing display examples of the client screen when the scroll operation is performed.

On the client screen, even when the scroll processing is executed in X direction or Y direction, as long as the constant display mode is set, the client display information according to the scroll position is displayed in the normal display area and the designated information remains to be displayed in the constant display area. When the client screen of the display state 103 in FIG. 13 is scrolled downward, the client screen comes to the display state 104 in FIG. 13. The display state 105 in FIG. 13 shows a display state obtained by scrolling rightward the display state 103 in FIG. 13. As shown in FIG. 13, as long as the constant display mode is set, even when the scroll processing is performed on the client screen, the designated information is always displayed in the constant display area.

Figure 14:
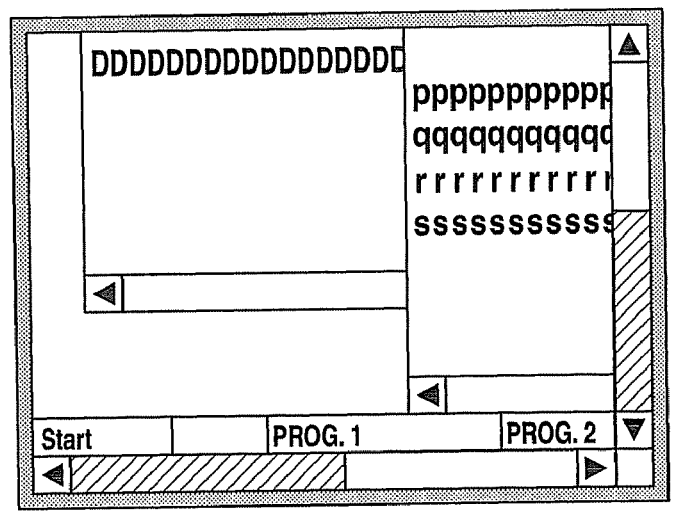
FIG. 14 is a view showing a display example when the constant display mode is not set.

While the constant display mode is set, when downward scrolling on the client screen is continued, the normal display area ends up to display the same designated information as the constant display area. The duplicate display of the same information on the client screen causes confusion. Therefore, in the case where the client display information, which is extracted from the virtual screen information on the basis of the scroll position information, includes the designated information ("Y" in step S2309), even when the constant display mode is set, the CPU 302 of the client apparatus 10 does not execute the processing of steps S2310 and S2311 (temporary stop of constant display function) as shown in FIG. 14.

In the above example, the lower-most area in the virtual screen is set as the designated area, and the lower-most area in the client screen is set as the constant display area. Accordingly, restricting the scroll position may avoid the duplicate display of the designated information. However, when information area such as a language bar, which can be located at anywhere in the screen, is set as the designated information, it is not practical to restrict the scroll position. Therefore, when the designated information is included in the client display information, i.e., when the determination result made in step S2309 is "Y", non-execution of the processing of steps S2310 and S2311 may avoid the duplicate display of the designated information.

FIG. 21 is a flowchart of the response operation processing executed by the client apparatus 10.

The response operation processing is executed when operation information entered by the user through the input device 303 instructs to perform display operation ("Y" in step S1903 of FIG. 19), and does not instruct to execute scroll processing ("N" in step S1910 of FIG. 19) in the above described input event processing.

The CPU 302 of the client apparatus 10 determines whether the constant display mode is set or not (step S2101). When it is determined that the constant display mode is not set ("N" in step S2101), the operation information input by the user is send to the server apparatus 20 (step S2107), and the response operation processing is terminated. In contrast, when it is determined that the constant display mode is set ("Y" in step S2101), the CPU 302 waits for the input (click) operation of the pointing device such as a mouse provided of the input device 303 (step S2102). When the input operation is performed by the user through the pointing device ("Y" in step S2102), the CPU 302 determines whether or not the point indicated by the pointer of the pointing device is within the constant display area designated in the foregoing area designation processing (step S2103 of FIG. 21).

When the point indicated by the pointer are outside the constant display area ("N" in step S2103), the operation information given by the pointing device and the information of the coordinates (click coordinates) of the point indicated by the pointer are transmitted to the server apparatus 20 (step S2107). In the client screen shown in FIG. 12, the lower rectangular area is set as the constant display area. Therefore, when the user performs the input operation by means of the pointing device within the upper rectangular area (normal display area) in the client screen depicted in FIG. 12, the operation information given by the pointing device and the information of the coordinates of the point indicated by the pointer are send to the server apparatus 20.

When it is determined that the point which is indicated by the pointer is inside the constant display area ("Y" at step S2103), the coordinate conversion processing is executed (step S2104).

By means of the coordinate conversion processing, the coordinates (click coordinates) of the point indicated by the pointer of the pointing device are converted into the corresponding coordinates on the virtual screen.

Figure 15:
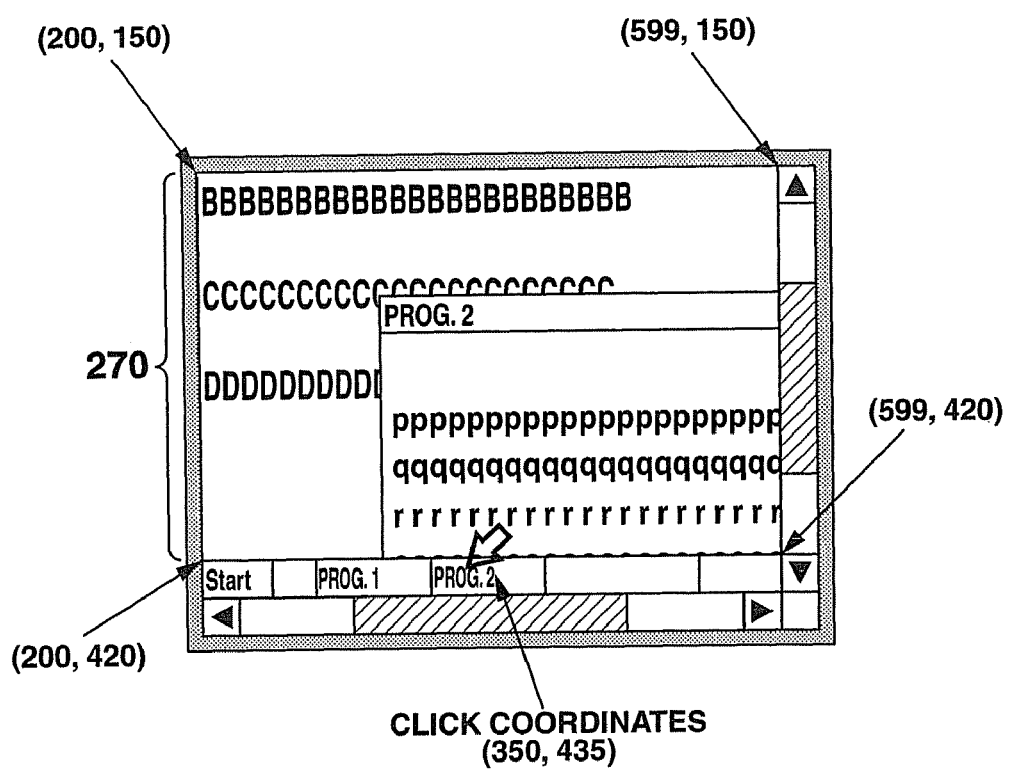
FIG. 15 is a view for explaining an example of coordinate transformation.

FIG. 15 shows a display state in which partial virtual screen information (client display information) corresponding to the client display area is extracted from the virtual screen information and displayed on the client screen. The client display area is a rectangular area having four vertices of (200, 150), (599, 150), (200, 420), and (599, 420).

The coordinate conversion processing is performed based on the following conversion formula for each of X direction and Y direction.

A converted coordinate={a click coordinate in client screen−(a coordinate of upper left point of client display area in virtual screen+a coordinate of upper left point of constant display area in client screen)}÷display magnification+a coordinate of upper left point of designated area in virtual screen.

For example, when the click coordinates are (350, 435), as shown in FIG. 15, the converted coordinates are expressed as follows:

$X$ coordinate={350−(200+0)}÷0.5+0=300;

$Y$ coordinate={435−(150+270)}÷1+570=585.

Figure 16:
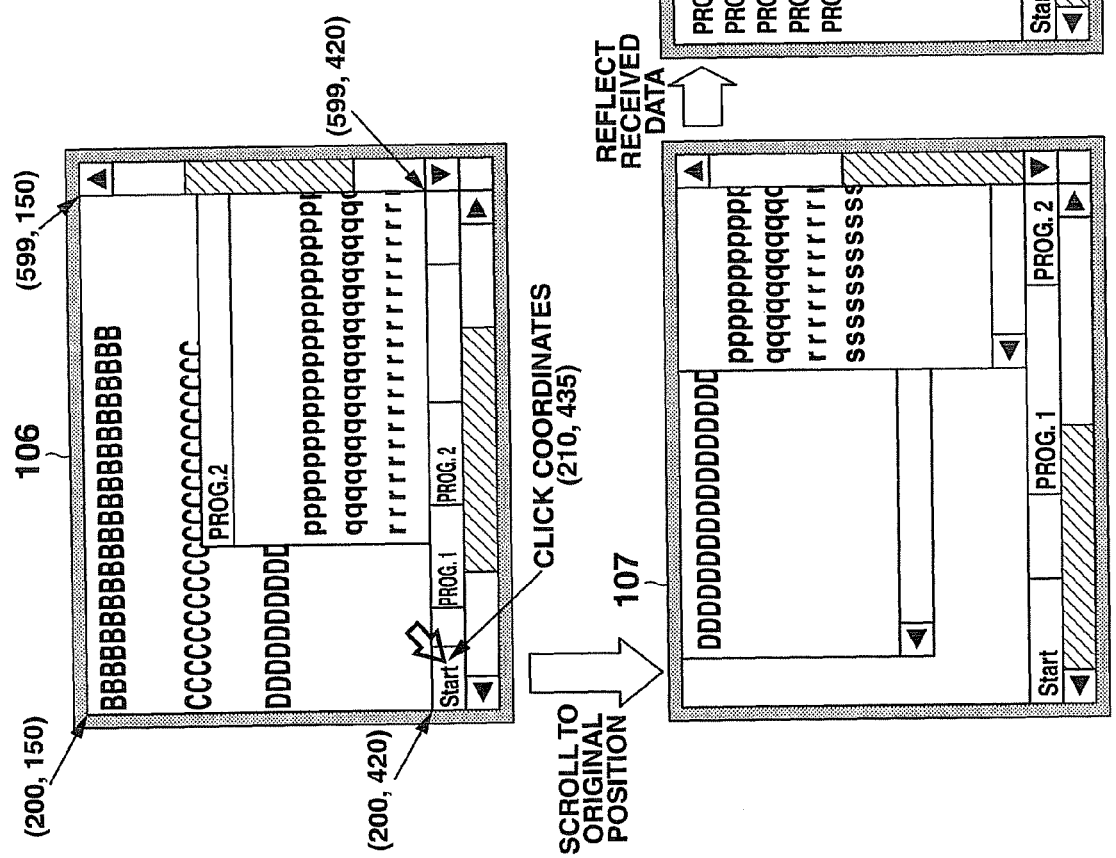
FIG. 16 is a view for explaining another example of the coordinate transformation.

As shown in FIG. 16, when the click coordinates are (210, 435), the converted coordinates are expressed as follows:

$X$ coordinate={210−(200+0)}÷0.5+0=20;

$Y$ coordinate={435−(150+270)}÷1+570=585.

When the coordinates of the point indicated by the pointer are converted into the coordinates on the virtual screen, the information of the converted coordinates is transmitted to the server 20 (step S2105). The CPU 302 reads the response operation corresponding to the coordinates of the point indicated by the pointer from the setting table and executes the read response operation (step S2106).

In the example shown in FIG. 15, the converted click coordinates are expressed as (300, 585). On the setting table shown in FIG. 10, a response operation corresponding to the click coordinates is not set. Therefore, the CPU 302 transmits the converted click coordinates (300, 585) to the server apparatus 20, and then the processing is terminated.

In the example shown in FIG. 16, the converted click coordinates are represented by (20, 585). In the setting table depicted in FIG. 10, scroll processing is set as the corresponding response operation. The CPU 302 sends the converted click coordinates (20, 285) and information that a start button is clicked to the server 20 as operation information made by the pointing device. The display state of the client screen changes from the display state 106 to the display state 107 in FIG. 16. The display of the client screen comes to display the leftmost and lower-most area of the virtual screen. In other words, the client display area including the click coordinates is extracted from the virtual screen and the extracted client display area is displayed on the client screen. Thereafter, the constant display mode is once cancelled.

When the server apparatus 20 receives the information representing that the start button is clicked (step S2204 of the server processing in FIG. 22), the server 20 executes the program corresponding to the received information, generates screen information, and transmits the generated screen information to the client apparatus 10 (steps S2207 to S2210 in FIG. 22). When the client apparatus 10 displays the received screen information, the display state 108 in FIG. 16 is displayed on the client screen (steps S1804 to S1806 in the client processing shown in FIG. 18).

The thin client system according to the present embodiment operates as described above.

As mentioned above, according to the present thin client system, the client screen may constantly display the designated area of the virtual screen. Therefore, it can be saved the trouble in scrolling for displaying the designated area on the client screen. When the user accesses the designated area, the coordinates (click coordinates) of the point at which the user accessed are converted into the coordinates in the virtual screen. The converted coordinate data is transmitted to the server apparatus 20. Thereby, information transmission according to intention of the user becomes to be possible. The user may set an arbitrary area as the designated area; moreover the user may set the position in the display screen at which the set designated area is displayed. Accordingly, the usability can be enhanced.

When the user accesses the constant display area, not only the transmission of the converted coordinates but also the set response operation corresponding to the area in which the user accesses such as the scroll processing is performed. Therefore, the subsequent processing comes to be facile.

The once settled setting information is stored and saved, in the present embodiment. When the connection condition is the same as the prior connection, the storage of the setting information may save the trouble of newly setting of the information.

Further, to avoid duplicate display of the designated information in both of the normal display area and the constant display area caused by the scroll operation, the constant display function can temporarily be cancelled.

In the above description, the display screen of the client apparatus 10 is smaller than the display screen of the server apparatus 20. However, it is possible to replace the client apparatus 10 by an application window in the above description. The size of the window in which the application is executed may be smaller than the size of the virtual screen.

A plurality of areas may be set as the designated areas. The user may determine where to display the constant display areas on the client screen, otherwise the CPU 302 may automatically determined where to display the constant display areas.

Figure 17:
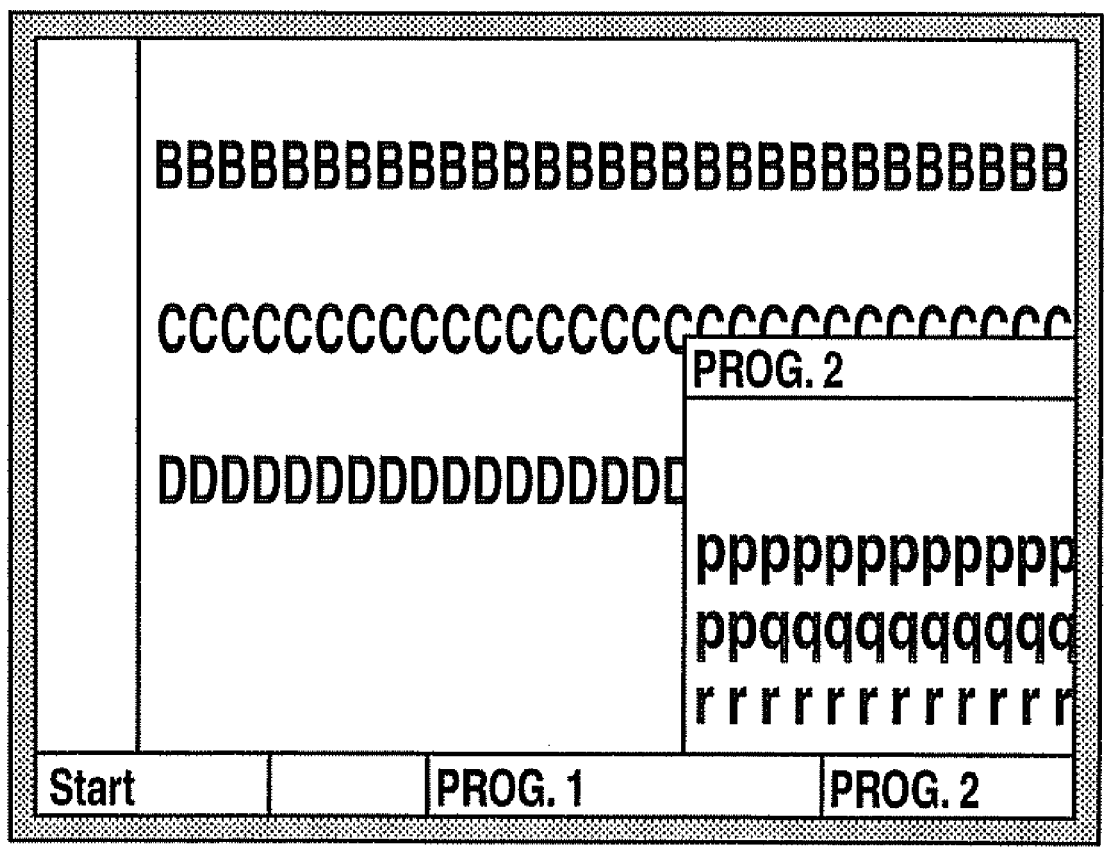
FIG. 17 is a view showing display example of the client screen when designated information is displayed without reduction.

In the above-mentioned explanation, the designated information is reduced and displayed so that the whole of the designated information can be displayed within the constant display area. However, as shown in FIG. 17, the designated information may be displayed as is, i.e., without being reduced, according to the scroll position.

In step S2001 of the area designation processing shown in FIG. 20, the virtual screen information is reduced in order that the entire virtual screen can be displayed on the client screen. However, the virtual screen information may not be reduced and the entire virtual screen may be displayed by use of the scroll function.

In the present embodiment, the pointing device such as a mouse or the like is utilized for designating the designated area and the constant display area. However, the designation can be performed by means of any method capable of specifying the position. For instance, a method of directly entering coordinate value may be utilized.

In the above description, the contents to be stored together with the setting table shown in FIG. 10 are a MAC address and a log-in name of a destination apparatus, and a size of the virtual screen. However, anything capable of specifying the connection destination, such as an internet protocol (IP) address and a computer name, may be stored. The user may name the setting of the connection condition for storage. Moreover, the user may select what setting to use according to the intention of the user itself.

In the above embodiment, every time the data is received, the whole screen is altered. However, only the area displayed on the screen may be updated.

The following is the description about the second embodiment according to the present invention.

Compared with the aforementioned first embodiment in which the designated information is constantly displayed, the designated information is displayed depending on a preset display condition in the second embodiment.

The following explanation of the second embodiment bases on the first embodiment. Only the portion which differs from the first embodiment will be described in detail. FIG. 24 is a view illustrating a data content stored in a setting table according to the second embodiment. In the second embodiment, the setting table illustrated in FIG. 24 stores such display condition that "when the pointer of the pointing device indicates a point within the constant display area, the designated information is displayed on the screen," in addition to the coordinate information of the constant display area.

Figure 26:
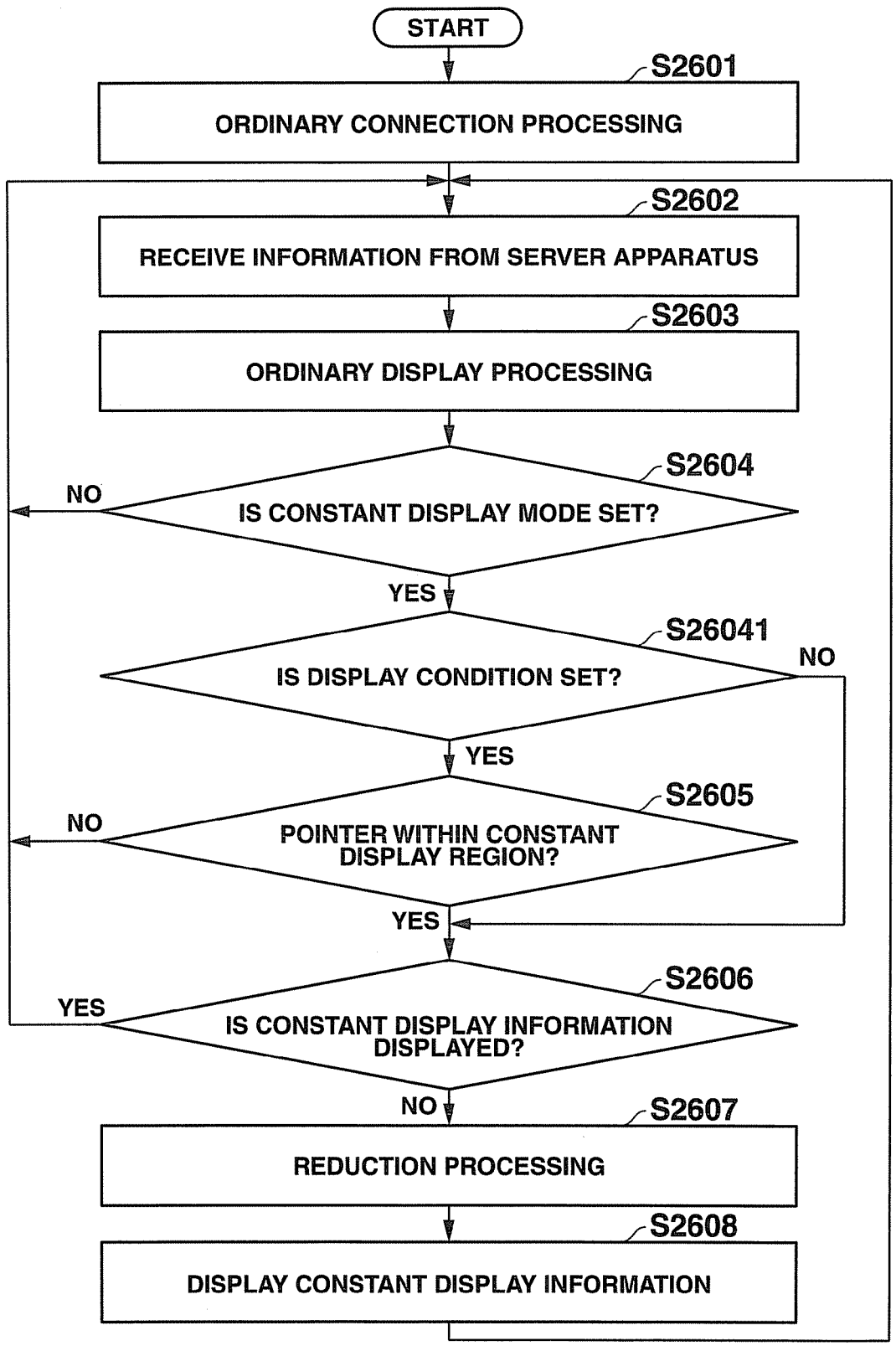
FIG. 26 is a flowchart of data reception and display processing according to the second embodiment.

FIG. 26 is a flowchart of data reception and display processing according to the second embodiment.

When the server apparatus 20 permits a connection request sent from the client apparatus 10 ("ordinary connection processing" in step S2601), the client apparatus 10 receives information transmitted from the server 20 (step S2602).

The CPU 302 of the client apparatus 10 executes ordinary display processing (step S2603). The ordinary display processing is similar to processing of steps S2303 to S2307 in FIG. 23. Subsequently, the CPU 302 determines whether the constant display mode is set or not (step S2604). When the CPU 302 determines that the constant display mode is not set ("N" in step S2604), the flow returns to step S2602.

When it is determined that the constant display mode is set ("Y" in step S2604), the CPU 302 determines whether or not the foregoing display condition is set for the constant display area, such that "when the pointer of the pointing device indicates a point within the constant display area, the designated information is displayed on the screen" (step S26041).

When the aforementioned display condition is not set for the constant display area ("N" in step S26041), the flow goes to step S2606. When the aforementioned display condition is set for the constant display area ("Y" in step S26041), the CPU 302 determines whether or not the point indicated by the pointer of the pointing device is within the constant display area (step S2605). When it is determined that the point indicated by the pointer of the pointing device is not within the constant display area ("N" in step S2605), the flow returns to step S2602. When it is determined that the point which is indicated by the pointer of the pointing device is within the constant display area ("Y" in step S2605), the CPU 302 determines whether or not the designated information is displayed on the client screen (step S2606).

When it is determined that the designated information is displayed on the client screen ("Y" in step S2606), the flow returns to step S2602. On the other hand, when it is determined that the designated information is not displayed on the client screen ("N" in step S2606), the CPU 302 extracts the designated information from the virtual screen information stored in the display buffer, and reduces the extracted designated information based on the display magnification (refer to FIG. 24) stored in the setting table (step S2607). The reduced designated information is displayed in the constant display area of the display screen (step S2608). Then the flow returns to step S2602.

Figure 25:
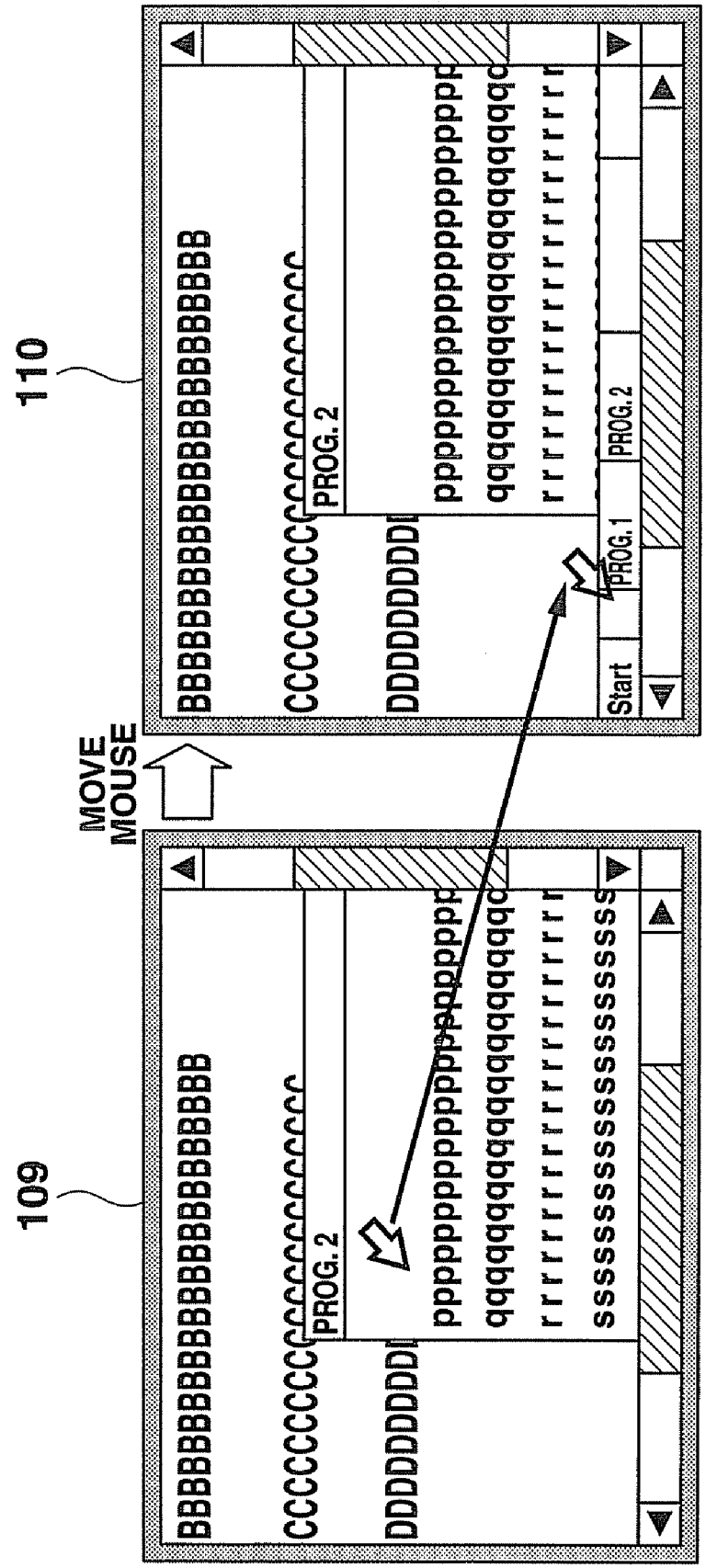
FIG. 25 is a view showing display examples of the client screen according to the second embodiment.

As display state 109 in FIG. 25 shows, when the pointer indicates the point outside the constant display area, the designated information is not displayed. As display state 110 in FIG. 25 shows, when the pointer indicates the point inside the constant display area, the designated information is displayed in the constant display area.

As described above, in the present embodiment, only when the pointer of the pointing device indicates the point within the constant display area, the designated information is displayed in the constant display area. The client screen may effectively be utilized since the designated information is only displayed when necessary.

In the second embodiment, the display condition is set on the basis of the coordinates of the point indicated by the pointer. However, it is a possible approach displaying the designated information in the constant display area when a predetermined button is depressed, or when predetermined audio data is input.

In the second embodiment, the designated information is always displayed in the constant display area while the display condition is being satisfied. However, the designated information may be displayed in the constant display area only within a predetermined time period after the display condition is satisfied. It is also possible to set a time period for displaying the designated information. For example, when the display condition is satisfied, the designated information may merely be displayed during a set time period.

Subsequently, the third embodiment of the present invention will be described.

In the first embodiment, by means of the area designation processing shown in FIG. 20, the designated area is set in such a manner that the user inputs information in response to guidance displayed on the display device 304 of the client apparatus 10. In the third embodiment, the client apparatus 10 obtains setting information of the constant display area from the server apparatus 20. The operation by the user is not required for setting the designated area.

The explanation of the third embodiment bases on the first embodiment. Only the portion differing from the first embodiment will be described hereinafter.

In step S1909 of the input event processing shown in FIG. 19; it is determined whether or not the setting table is prepared. When it is determined that the setting table is not prepared ("N" in step S1909), the area designation processing is performed (step S1905). In the first embodiment, the area designation processing depicted in FIG. 20 is performed; however, in the third embodiment the area designation processing described below is executed.

Figure 27:
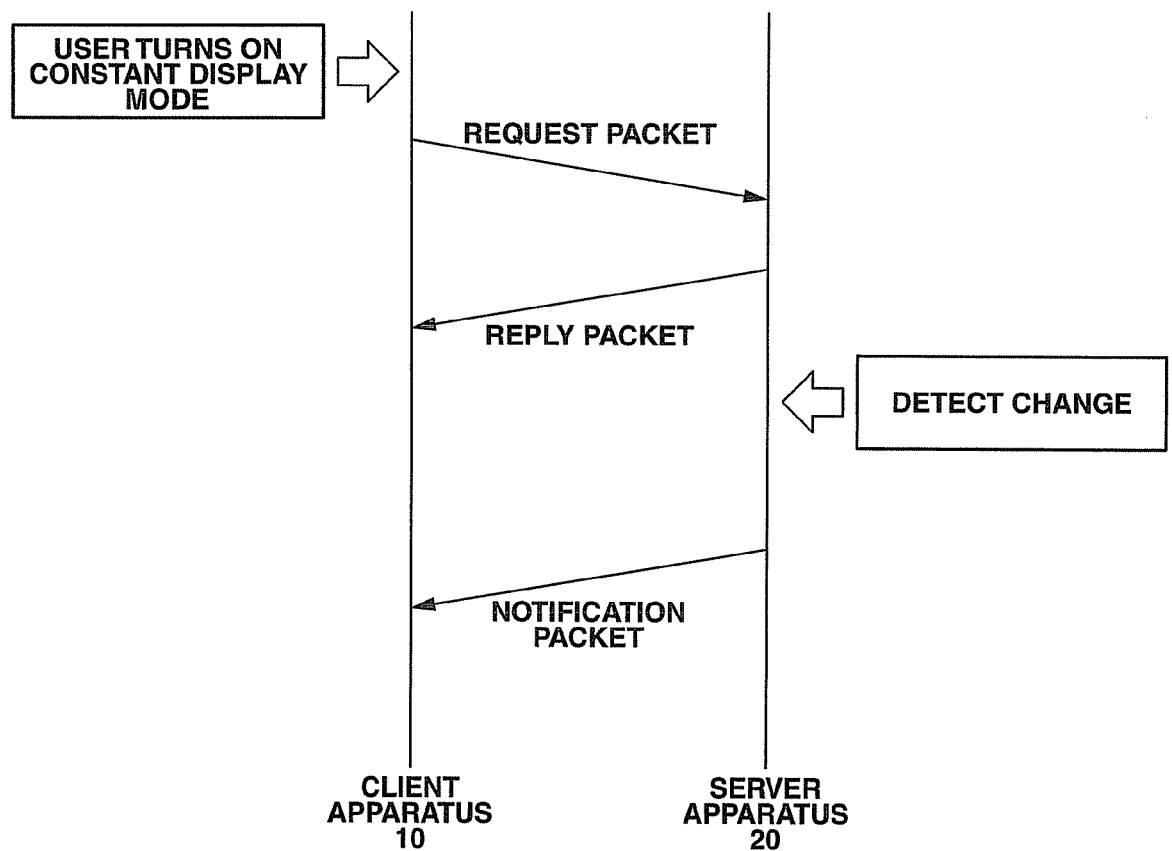
FIG. 27 is a view for explaining data communication between the client apparatus 10 and the server apparatus 20.
Figure 28:
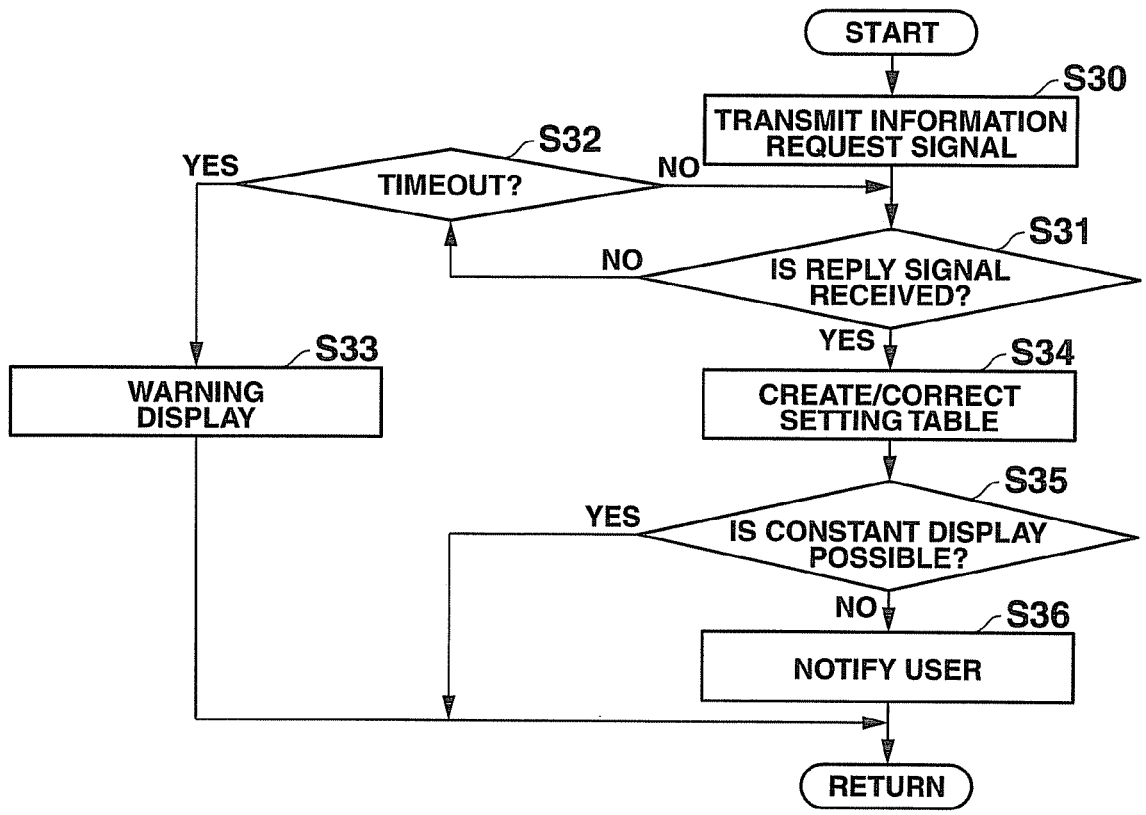
FIG. 28 is a flowchart showing operation executed by the client apparatus 10 in the area designation processing according to the third embodiment.
Figure 29:
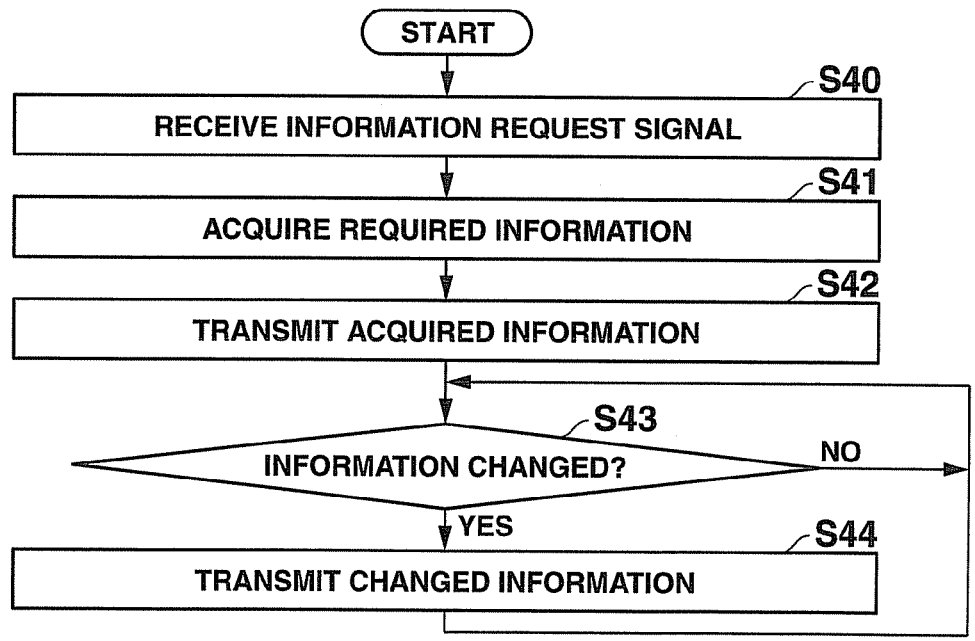
FIG. 29 is a flowchart showing operation executed by the server apparatus 20 in the area designation processing according to the third embodiment.

FIG. 27 is a view for explaining data communication between the client apparatus 10 and the server apparatus 20. FIG. 28 is a flowchart illustrating operation executed by the client apparatus 10 in the area designation processing according to the third embodiment. FIG. 29 is a flowchart illustrating operation executed by the server apparatus 20 in the area designation processing according to the third embodiment.

When the area designation processing is started, the client apparatus 10 transmits a signal for requesting information (request packet in FIG. 27) to the server apparatus 20 (step S30). In the present embodiment, the signal requires information on the task bar. The client apparatus 10 waits for the server apparatus 20 to transmit the reply signal (reply packet of FIG. 27) (step S31). When the reply packet is not received even when a predetermined time period elapses ("N" in steps S31 and S32), the client apparatus 10 displays a warning message (step S33), and the processing is terminated. When the reply signal is received within the predetermined time period ("Y" in step S31), the client apparatus 10 creates or corrects the setting table (refer to FIG. 10) on the basis of the received reply signal (step S34). However, when the information on the task bar transmitted from the server apparatus 20 includes setting information: "hide task bar automatically"; and "does not display task bar in front", there may be a case in which the task bar is not displayed in the constant display area. When receiving such setting information that the task bar cannot always be displayed ("N" in step S35), the client apparatus 10 notifies the user to change the setting of the task bar (step S36).

The server apparatus 20 receives the request signal (request packet in FIG. 27) which the client apparatus 10 transmits in step S30 of FIG. 28 for the information on the task bar (step S40). The CPU 202 of the server apparatus 20 obtains the required setting information on the task bar from the predetermined storage area (step S41). The server apparatus 20 transmits a reply signal (reply packet in FIG. 27) including the acquired task bar information (a position of task bar, whether the task bar is automatically hidden or not, whether the task bar is displayed in front or not, and so on) to the client apparatus 10 (step S42).

Thereafter, when the task bar information is changed in the server apparatus 20 (step S43), the server apparatus 20 transmits the change information (notification packet in FIG. 27) to the client apparatus 10 (step S44). The client apparatus 10 receives, in step S31 of FIG. 28, the reply information which the server apparatus transmits in step S44 or the change information which the server 20 transmits in step S46.

As mentioned above, in the thin client system according to the present embodiment, the designated area is automatically set by acquiring the setting information about the designated area from the server apparatus 20.

Based on the setting information received from the server apparatus 20, it can be determined whether or not it is possible to constantly display the designated information. Displaying the hidden task bar is prevented. Moreover, the user may recognize the display status by the notification to change the status.

In the present embodiment, the object of the constant display is the task bar; however, the language bar may be set as the object of the constant display. Any information, which can be acquired from the server apparatus 20, may be set as the object of the constant display.

The embodiments of the present invention are described with reference to the drawings. The embodiments of the present invention can be realized by hardware, or firmware or software of a digital signal processor (DSP) board or a CPU board, as a function of a server apparatus or a client apparatus.

The server apparatus and the client apparatus to which the present invention is applied are not limited to the above embodiments. As long as function thereof can be executed, the server apparatus and the client apparatus may be units of devices, systems or integrated devices including a plurality of devices, and systems in which processing is performed via a network such as a LAN and a wide area network (WAN).

A system including components which are interconnected via a bus, such as a CPU, a memory of a ROM and a RAM, an input device, an output device, an external storage device, a media drive device, a network connecting device, may realize the present invention. Namely, the present invention is realized as follows, that is, the client apparatus is provided with a memory unit, which stores a program of software realizing the aforementioned embodiments, such as the ROM, the RAM, the external storage device, or the portable storage medium; and computers of the server apparatus and the client apparatus read and execute the program. In such a case, the program itself, which is read from the memory unit, achieves the functions of the present invention, and the memory unit storing the program may be a component part of the present invention.

A flexible disk, a hard disk, an optical disk, an optical magnetic disk, a CD-ROM, a CD-R, a DVD-ROM, a DVD-RAM, magnetic tape, a nonvolatile memory card, a ROM card, and a variety of storage media which stores the program via a network connecting device (i.e., a communication line) for e-mail or PC communication, and so on, may be utilized as the portable recording medium for providing the program.

The functions of the foregoing embodiments are realized as a result of the execution of the program which is expanded on a memory by a computer (information processor). In addition, an operation system or the like running on the computer executes a part or a whole of actual processing based on the instructions of the program, the processing realizes the functions of the above-described embodiments.

Further, the program read from the portable recording medium or the program (data) provided by a program (data) provider are written into a memory, which belongs to a function enhancement board inserted into the computer, or a function enhancement unit connected to the computer. Thereafter, the CPU or the like, which is implemented on the function enhancement board or the function enhancement unit, executes the part or the whole of the actual processing under the control of the instructions of the program. The processing of the CPU realizes the functions of the above-described embodiments.

Namely, the present invention is not limited to the above described embodiments, and various configurations or forms may be made without departing from the spirit or scope of the present invention.

What is claimed is:

1. A client apparatus for use in a thin client system comprising a server apparatus configured to generate, as a virtual image, display data to be displayed by the client apparatus, the client apparatus being connectable to the server apparatus, receiving the display data generated by the server apparatus and supplied from the server apparatus via a network, and displaying received display data, the client apparatus comprising:

a display unit with a display screen comprising a constant display area and a normal display area, wherein the constant display area is configured to display the received display data with fixing a display position of the received display data to a fixing position and the normal display area is configured to display the received display data with maintaining a display position of the received display data;

a memory configured to store a portion of the display data of the virtual image to be displayed in the constant display area of the display unit and an area range of the constant display area, the area range indicating a position of the display unit which displays the portion of the display data, the portion and the area range being associated;

an extraction unit configured to extract the portion of the display data which is received and to be displayed in the constant display area based on the area stored in the memory; and a display controller configured to constantly display the portion of the display data which is extracted by the extraction unit in the constant display area;

a designation unit configured to arbitrary designate the portion of the display data to be displayed in the constant display area of the display unit and the area range of the constant display area which displays the portion of the display data, and wherein the portion of the display data and the area range of the constant display area designated by the designation unit stored in the memory.

2. The client apparatus according to claim 1, wherein the display controller is configured to display the portion of the display data of the virtual image with being reduced in size in the constant display area of the client apparatus.

3. The client apparatus according to claim 1, further comprising:
an input unit configured to designate a portion of the display screen; and
wherein the display controller is configured to display the portion of the display data in the constant display area when the input unit is configured to designate a position of the constant display area.

4. The client apparatus according to claim 1, wherein
the memory is configured to further store an address of the destination, the portion, the area range, and the address being associated; and
the extraction unit is configured to extract the portion of the display data which is received and to be displayed in the constant display area based on the address.

5. The client apparatus according to claim 1, further comprising:
an input unit configured to designate a position of the display screen;
a conversion unit configured to convert a coordinate of the position of the display screen designated by the input unit to a coordinate of a corresponding position of the virtual image when the input unit designates a position of the constant display area; and
a transmission unit configured to transmit the coordinate of the virtual image obtained by the conversion unit to the server apparatus.

6. The client apparatus according to claim 5, wherein
the conversion unit is configured to convert the coordinate of the position of the display screen designated by the input unit to the coordinate of the corresponding position of the virtual image based on the area range of the constant display area stored in the memory.

7. A client apparatus for use in a thin client system comprising a server apparatus configured to generate, as a virtual image, display data to be displayed by the client apparatus, the client apparatus being connectable to the server apparatus, receiving the display data generated by the server apparatus and supplied from the server apparatus via a network, and displaying received display data, the client apparatus comprising:
a display unit with a display screen comprising a constant display area and a normal display area, wherein the constant display area is configured to display the received display data with fixing a display position of the received display data to a fixing position and the normal display area is configured to display the received display data with maintaining a display position of the received display data;
an extraction unit configured to extract a portion of the display data which is received and to be display in the constant display area;
a display controller configured to constantly display the portion of the display data which is extracted by the extraction unit in the constant display area;

a memory configured to store the portion of the display data of the virtual image to be displayed in the constant display area of the display unit and an area range of the constant display area, the area range being stored as a coordinate;
an input unit configured to designate a position of the display screen;
a conversion unit configured to convert a coordinate of the position of the display screen designated by the input unit to a coordinate of a corresponding position of the virtual image when the input unit designates a position of the constant display area;
a transmission unit configured to transmit the coordinate of the virtual image obtained by the conversion unit to the server apparatus;
a designation unit configured to arbitrary designate the portion of the display data to be displayed in the constant display area of the display unit and the area range of the constant display area which displays the portion of the display data, and
wherein the portion of the display data and the area range of the constant display area designated by the designation unit stored in the memory.

8. The client apparatus according to claim 7, wherein
the memory is configured to further store an address of a destination, the portion, the area range, and the address being associated; and
the conversion unit is configured to convert the coordinate of the position of the display screen designated by the input unit to the coordinate of the corresponding position of the virtual image based on the address.

9. A computer program product, comprising:
a non-transitory computer-readable storage medium, comprising:
for causing a client apparatus for use in a thin client system to receive display data, as a virtual image, from a server apparatus via a network;
code for causing the client apparatus that is connectable to the server apparatus to display received display data, generated and supplied by the server apparatus, on a display screen that includes a constant display area and a normal display area, wherein the constant display area is configured to display the received data with fixing a display position of the received display data to a fixing position and the normal display area is configured to display the received display data with maintaining a display position of the received display data;
code for causing the client apparatus to store, in a memory, a portion of the display data corresponding to a portion of the virtual image to be displayed in the constant display area and an area range of the constant display area, the area range indicates a position of the display screen which displays the portion of the display data, wherein the portion of the display data and the area range are stored in association;
code for causing the client apparatus to extract the portion of the display data, which is to be displayed in the constant display area based upon the area range stored in the memory, from the received display data;
code for causing the client apparatus to constantly display the portion of the display data extracted in the constant display area of the display screen;
code for arbitrary designating the portion of the display data to be displayed in the constant display area of the display unit and the area range of the constant display area which displays the portion of the display data, and wherein the portion of the display data and the area range of the constant display area designated is stored in the memory.

10. A computer program product, comprising:

a non-transitory computer-readable storage medium, comprising:

code for causing a client apparatus for use in a thin client system to receive display data, as a virtual image, from a server apparatus connectable to the client apparatus via a network;

code for causing the client apparatus to display received display data, generated and supplied by the server apparatus, on a display screen that includes a constant display area and a normal display area, wherein the constant display area is configured to display the received data with fixing a display position of the received display data to a fixing position and the normal display area is configured to display the received display data with maintaining a display position of the received display data;

code for causing the client apparatus to extract a portion of the display data which is received, wherein the portion of the display data is to be displayed in the constant display area;

code for causing the client apparatus to constantly display, in the constant display area, the portion of the display data which is extracted;

code for causing the client apparatus to store, in a memory, the portion of the display data corresponding to a portion of the virtual image to be displayed in the constant display area and an area range of the constant display area, the area range being stored as a coordinate;

code for causing the client apparatus to designate a position of the display screen;

code for causing the client apparatus to convert a coordinate of the position of the display screen designated to a coordinate of a corresponding position of the virtual image when the designated position corresponds to a position of the constant display area;

code for causing the client apparatus to transmit, to the server apparatus, the coordinate of the virtual image converted;

code for arbitrary designating the portion of the display data to be displayed in the constant display area of the display unit and the area range of the constant display area which displays the portion of the display data, and wherein the portion of the display data and the area range of the constant display area designated is stored in the memory.

\* \* \* \* \*